(12) United States Patent
Doan et al.

(10) Patent No.: US 7,557,932 B2
(45) Date of Patent: Jul. 7, 2009

(54) CHARACTERIZATION OF MICROMIRROR ARRAY DEVICES USING INTERFEROMETERS

(75) Inventors: Jonathan Doan, Mountain View, CA (US); Regis Grasser, Mountain View, CA (US); Satyadev Patel, Sunnyvale, CA (US); Andrew Huibers, Palo Alto, CA (US); Igor Volfman, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 275 days.

(21) Appl. No.: 11/110,338

(22) Filed: Apr. 19, 2005

(65) Prior Publication Data

US 2006/0245032 A1 Nov. 2, 2006

(51) Int. Cl.
 *G01B 9/02* (2006.01)
(52) U.S. Cl. .................................................... 356/512
(58) Field of Classification Search ......... 356/511–516, 356/495, 489
See application file for complete search history.

(56) References Cited

U.S. PATENT DOCUMENTS

| | | | |
|---|---|---|---|
| 4,329,059 A * | 5/1982 | Pond et al. ................ | 356/520 |
| 4,639,139 A | 1/1987 | Wyant et al. | |
| 4,776,698 A | 10/1988 | Crosdale | |
| 4,794,550 A | 12/1988 | Greivenkamp, Jr. | |
| 4,984,893 A | 1/1991 | Lange | |
| 4,988,886 A | 1/1991 | Palum et al. | |
| 5,069,548 A | 12/1991 | Boehnlein | |
| 5,771,095 A | 6/1998 | Prokryl et al. | |
| 5,808,724 A | 9/1998 | Ina et al. | |
| 6,088,474 A | 7/2000 | Dudasko et al. | |
| 6,195,168 B1 * | 2/2001 | De Lega et al. ............. | 356/497 |
| 6,341,259 B1 | 1/2002 | Gutierrez et al. | |
| 6,708,132 B1 | 3/2004 | Gutierrez et al. | |
| 6,765,680 B2 * | 7/2004 | Carr et al. ................... | 356/510 |
| 6,788,210 B1 | 9/2004 | Huang et al. | |
| 6,847,461 B1 | 1/2005 | Latypov et al. | |
| 6,922,483 B2 | 7/2005 | Doane | |
| 6,943,895 B2 * | 9/2005 | Prinzhausen et al. ........ | 356/497 |
| 2001/0019415 A1 | 9/2001 | Prikryl et al. | |
| 2003/0137655 A1 | 7/2003 | Wegmann | |
| 2003/0218753 A1 | 11/2003 | Reuter | |
| 2003/0223084 A1 | 12/2003 | Mehri et al. | |
| 2004/0042000 A1 | 3/2004 | Mehri et al. | |
| 2004/0109168 A1 | 6/2004 | Fukui | |
| 2004/0207386 A1 | 10/2004 | Durr | |
| 2006/0119862 A1 * | 6/2006 | Han et al. ................... | 356/512 |

OTHER PUBLICATIONS

Mike Zacchino, Characterizing MEMS Devices Through Transparent Media, Veeco Instruments, 2004, 2 pgs.
Zygo Corporation, New View 60000 Series of 3D Optical Profilers, 2 pgs.

(Continued)

*Primary Examiner*—Hwa (Andrew) S Lee
(74) *Attorney, Agent, or Firm*—Charles A. Brill; Wade James Brady, III; Frederick J. Telecky, Jr.

(57) ABSTRACT

The invention provides a method and apparatus for evaluating the quality of microelectromechanical devices having deformable and deflectable members using resonation techniques. Specifically, product quality characterized in terms of uniformity of the deformable and deflectable elements is inspected with an optical resonance mapping mechanism on a wafer-level.

23 Claims, 12 Drawing Sheets

OTHER PUBLICATIONS

Furlong, et al., Dynamic Analysis and Characterization of MEMS Accelerometers by Computational and Opto-Electromechanical Methodologies, IEEE 43$^{rd}$ Annual International Reliability Physics Symposium, San Jose 2005, pp. 325-329.

Henry Chu, et al., "DMD superstructure Characterizations", Jul.-Sep. 1998, pp. 75-86.

W.N. Sharpe, et al. "Tensile testing of MEMS materials-recent progress". Journal of Materials Science 38 (2003), pp. 4075-4079.

T.E. Buchheit, et al., "Micromechanical testing of MEMS materials", Journal of Materials Science 38 (2003), pp. 4081-4086.

S.M. Allameh, et al., "An introduction to mechanical- properties-related issues in MEMS structures", Journal of Materials Science 38 (2003), pp. 4115-4123.

S.M. Allameh, et al., Surface topography evolution and fatigue fracture of polysilicon, Journal of Materials Science 38 (2003), pp. 4145-4155.

Ken Gall, et al., "Thermomechanical response of bare and $Al_2O_3$—nanocoated Au/Si bilayer beams for micromechanical systems", J. Mater. Res., vol. 18, No. 7, Jul. 2003, pp. 1575-1587.

* cited by examiner

CHARACTERIZATION OF MICROMIRROR ARRAY DEVICES USING INTERFEROMETERS

TECHNICAL FIELD OF THE INVENTION

The present invention relates to the field of microelectromechanical devices, and more particularly to methods and apparatus for characterizing microelectromechanical devices.

BACKGROUND OF THE INVENTION

Microelectromechanical (MEMS) devices have found many applications in basic signal transductions. For example, MEMS-based spatial light modulators are transducers that modulate incident light in a spatial pattern in response to optical or electrical inputs. The incident light may be modulated in phase, intensity, polarization, or direction. This modulation may be accomplished through the use of a variety of materials exhibiting magneto-optic, electro-optic, or elastic properties. Such spatial light modulators have many applications, including optical information processing, display systems, and electrostatic printing.

A microelectromechanical device often contains one or more deflectable members. For example, a typical micromirror-based spatial light modulator consists of an array of reflective deflectable mirror plates that are formed on a substrate with each mirror plate being attached to a deformable hinge. In operation, the mirror plates are individually addressable and deflectable with electrostatic fields so as to modulate incident light. The performance of the spatial light modulator depends upon the coordination of the mirror plates. That is, the successful light modulation depends on the uniformity of the mirror plates and hinges.

For quality assurance purposes, it is certainly required to inspect the functional members of microelectromechanical devices before delivery to customers. The inspection, however, is often preferably to be performed during the fabrication process for many reasons. For example, after completion of the deformable and/or deflectable elements, one or more succeeding processing steps, such as surface treatment, assembly and packaging are often required before the completion of the fabrication process. From at least the cost-effective point of view, inspection of the formed deflectable and/or deformable elements is desired to be conducted before performing the succeeding processing steps. According to the inspection, the fabricated devices not satisfying the predetermined criterion can be discarded, while the fabricated devices satisfying the criterion are saved for further processes.

Therefore, what is desired is a method and apparatus for inspecting fabricated microelectromechanical devices having deflectable and/or deformable members.

SUMMARY OF THE INVENTION

The objects and advantages of the present invention will be obvious, and in part appear hereafter and are accomplished by the present invention that provides a method and apparatus for characterizing microelectromechanical devices comprising an array of movable elements. The methods can be performed for microelectromechanical devices during or after the fabrication of the microelectromechanical devices. Specifically, when the method is performed during the fabrication process, for example after the functional members of the microelectromechanical devices being formed, the characterization information obtained therefrom can be used as the bases for the following processes. This is especially useful for improving the production yield. The process can also be performed after the fabrication, for example before delivering to customers.

The methods of the present invention can be performed on wafer lever. Specifically, the method can be performed for a wafer that comprises a plurality of device dies, each die having an array of movable elements of the microelectromechanical devices. This is of great importance when the microelectromechanical devices are fabricated on wafer lever. The methods of the present invention are also applicable to measurements of microelectromechanical devices through light transmisssive substrates. This feature enables characterizations being performed for microelectromechanical devices in packages with light transmisssive package covers.

As one embodiment of the invention, a device wafer is characterized. The device wafer comprises a plurality of device dies with each die comprising an array of reflective deflectable elements. The characterization process comprises the steps of: directing a beam of light onto the reflective deflectable elements through a light transmisssive substrate that is part of the microelectromechanical device; obtaining an image of the reflective deflectable elements with the light beam reflected from the deflectable reflective elements, wherein the image has a resolution in the order of micron; and extracting a set of parameters that characterize the deflectable reflective elements from the obtained image.

As an aspect of the embodiment, the characterization parameters comprise a parameter that characterizes the curvature induced displacement of the individual deflectable reflective elements. As another aspect of the embodiment, the characterization parameters comprise a parameter that characterizes the twist of the individual deflectable reflective elements. As yet another aspect of the embodiment, the characterization parameters comprises a parameter that characterizes the side tilt of the individual deflectable reflective elements. As yet another aspect of the embodiment, the deflectable reflective elements are reflective deflectable mirror plates of micromirrors. The micromirrors can be in an array of a spatial light modulator device applicable in digital display systems. Alternatively, the micromirrors can be on a wafer that has a plurality of device dies. The deflectable reflective mirror plates can be underneath a light transmisssive substrate that is a part of the micromirror devices. The light transmisssive substrate can also be a light transmisssive package cover that is attached to a package substrate so as to form a space therebetween in which space the micromirrors can be disposed. Alternatively, the light transmisssive substrate can be a substrate that is placed above the reflective deflectable mirror plates, either on a wafer level or on a die level, for protecting the reflective deflectable mirror plates during the characterization processes. The light transmisssive substrate can be of different thicknesses and/or of different light transmisssive materials, such as materials of different optical indices, as long as at least a portion of the incident light beam can travel through the light transmisssive substrate and generates an observable image in a photodetector.

The image of the reflective deflectable mirror plates can be formed through interference of light beams split from one single light beam, and respectively reflected from the mirror plates and a reference mirror. In this situation, either the reference mirror or the reflecting surfaces of the mirror plates, or both are movable in relation to the location where the incident light beam is split. In this way, the phase-coherency of the reflected light beams from the mirror plates and the reference mirror can be secured by relatively adjusting the reference mirror and the surface of the reflective deflectable mirror plates, either individually or in combination. The movements of the reference mirror and the reflecting surfaces of the reflective deflectable mirror plates can be achieved through micro-actuators, such as piezo-actuators (e.g. piezoelectric actuators of lead zirconium titanate) and micro-step motors.

Such objects of the invention are achieved in the features of the independent claims attached hereto. Preferred embodiments are characterized in the dependent claims. In the claims, only elements denoted by the words "means for" are intended to be interpreted as means plus function claims under 35 U.S.C. §112, the sixth paragraph.

BRIEF DESCRIPTION OF DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE EMBODIMENTS

Figure 1:
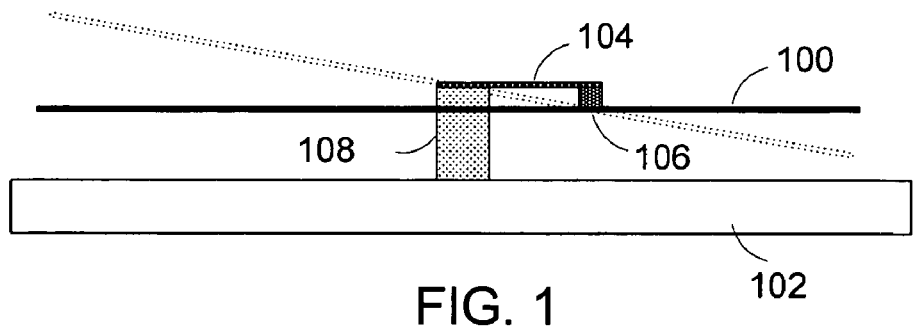
FIG. 1 is a cross-sectional view of an exemplary micromirror.

The present invention is applicable to characterize a variety of microelectro-mechanical devices with multiple reflective microelements. In following the present invention will be discussed with reference to particular examples within the microelectro-mechanical devices are micromirror array devices, each having an array of deflectable reflective mirror plates. However, it will be immediately appreciated by those skilled in the art that the following discussion is for demonstration purposes only, and should not be interpreted as a limitation. Instead, any variations without departing from the spirit of the invention are also applicable. For example, the present invention is also applicable to characterize micromirror based optical switches, liquid crystal devices, liquid crystal on silicon devices, or other types of micro-devices. For another exemplary, the present invention is applicable to characterize nanostructured devices with multiple functional elements exposed to illumination light. In addition to microelectromechanical devices, the present invention can also be applied in biological, chemistry, and other similar fields for characterizing devices or samples whose elements of interests are in the typical size of microns.

Turning to the drawings, a cross-sectional view of a typical micromirror having a reflective deflectable mirror plate is illustrated therein. In this example, the micromirror comprises reflective deflectable mirror plate 100 attached to a deformable hinge (e.g. deformable hinge 110 in FIG. 2) at attachment point 106. The deformable hinge, as well as the mirror plate is held by hinge support 104 that is supported by post 108 on substrate 102. Substrate 102 can be a light transmissive substrate, such as glass, quartz, and sapphire, or can be a standard semiconductor substrate on which integrated circuits can be fabricated.

Figure 2:
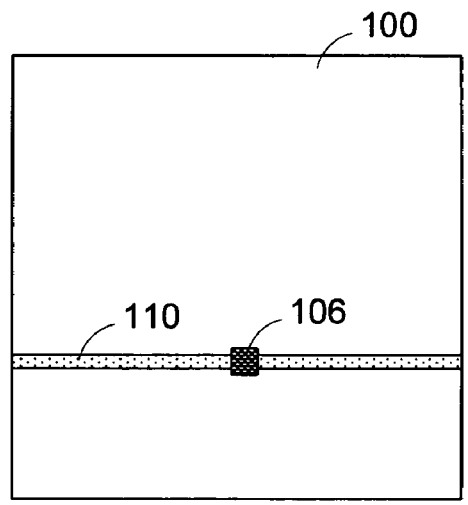
FIG. 2 is a top view of an exemplary deflectable reflective mirror plate of the micromirror in FIG. 1.

The deflectable reflective mirror plate of the micromirror in FIG. 1 is illustrated in top view in FIG. 2. Referring to FIG. 2, mirror plate 100 is attached to deformable hinge 110 at attachment 106. The mirror plate, in fact, can be attached to the deformable hinge in many possible ways. For example, the mirror plate can be attached to the deformable hinge such that the deformable hinge and mirror plate are in different planes (e.g. planes that are spaced apart in the direction perpendicular to the mirror plate when the mirror plate is parallel to substrate 102). Alternatively, the mirror plate can be attached to the deformable hinge such that the mirror plate and deformable hinge can be on the same plane (e.g. the plane of the mirror plate). The mirror plate can also be attached to the deformable hinge with the attachment point around the geometrical center of the mirror plate, or away from the geometrical center of the mirror plate. When the mirror plate is attached to the deformable hinge with the attachment point around the geometrical center, the mirror plate rotates symmetrically—that is, the maximum angle achievable by the mirror plate in one rotation direction is substantially the same as that in the opposite direction. When the mirror plate is attached to the deformable hinge with the attachment away from the geometrical center of the mirror plate, the maximum angles achievable by the mirror plate in opposite rotation direction are not the same, which instance benefits better separation of the reflected light from the stats when the mirror plate is rotated in opposite directions.

Figure 3:
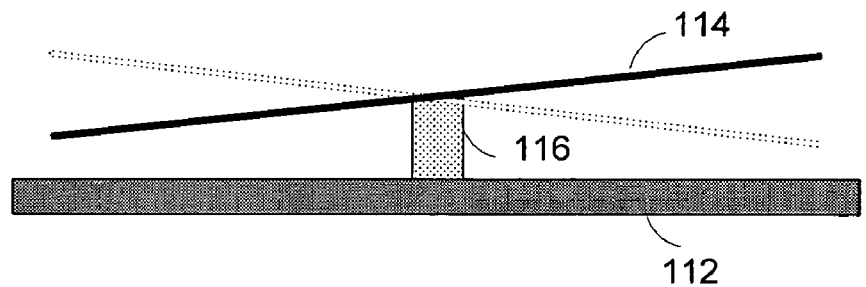
FIG. 3 is another exemplary micromirror shown in cross-sectional view.

Another typical configuration of a micromirror device is illustrated in FIG. 3. Referring to FIG. 3, reflective deflectable mirror plate is attached to and held by post 116 in a way such that the mirror plate rotates symmetrically in opposite rotation directions. The post is formed on substrate 112 that is preferably a standard semiconductor substrate.

Other than the examples shown in FIG. 1 and FIG. 3, the micromirror may have a variety of other different configurations. For example, a micromirror may comprise a reflective deflectable mirror plate derived from a single crystal material with the deformable hinge also being a single crystal or a thin film. Moreover, an addressing electrode can be provided for deflecting the mirror plate with the mirror plate and addressing electrode being formed on the same substrate (e.g. a semiconductor substrate), or on separate substrates (e.g. a semiconductor and light transmissive substrates).

The micromirror devices can be characterized in many aspects. For example, the micromirror devices can be characterized by the curvature of the mirror plates, twist of the mirror plates relative to the deformable hinges, and side tilt of the mirror plates of the micromirror devices, which will be discussed in detail in the following with reference to FIG. 4 to FIG. 7.

The mirror plate may be curved intentionally or intentionally. Specifically, even if a flat mirror plate without curvature is desired, the fabricated mirror plate (e.g. after releasing by removing the sacrificial materials) can be unintentionally curved due to many reasons, such as materials of the mirror plates and sacrificial materials being used and the fabrication processes for the micromirrors. The unintentional curvature in the mirror plate certainly brings about deviation to the desired performance, thus degrading the performance of the micromirror device having the unintentionally curved mirror plate. On the other hand, however, appropriate curvature in a mirror plate may have other benefits. For example, micromirror array devices with micromirrors having curved mirror plates may have higher contrast ratio than those otherwise, because the curved mirror plates exhibit superior abilities in separating the reflected illumination light from different operation states, such as the ON and OFF states. For this reason, some micromirror devices are designed to have certain curvatures in their mirror plates. In either example, the curvature of the mirror plates needs to be quantitatively characterized.

Figure 4:
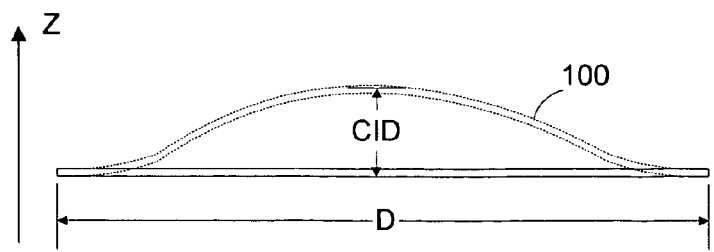
FIG. 4 illustrates a curved mirror plate and a quantitative characterization.

One way to quantitatively characterize the curvature in a mirror plate is illustrated in FIG. 4. Referring to FIG. 4, a cross-section view of a reflective deflectable mirror plate 100 is illustrated therein. The mirror plate without curvature is illustrated in solid lines, while the curved mirror plate is illustrated in dashed lines. Assuming the mirror plate has length D, and the curvature is along the Z direction in the Cartesian coordinate, the curvature k of the mirror plate can be defined, in the two dimensions, as:

$$k \equiv \frac{d\phi}{ds} \quad \text{(Eq. 1)}$$

wherein $\phi$ is the tangential angle, that is defined as:

$$\rho d\phi = ds \quad \text{(Eq. 2)}$$

with $\rho$ being the radius of curvature, and s being the arc length.

By letting the mirror plate curve being given by Cartesian parameter equations of:

$$\begin{cases} x = x(t) \\ y = y(t) \end{cases} \quad \text{(Eq. 3)}$$

curvature k in equation 1 can be expressed as:

$$k = \frac{x'y'' - y'x''}{(x'^2 + y'^2)^{3/2}} \quad \text{(Eq. 4)}$$

wherein x' and x" being the first and second order of derivatives of x; and y' and y" being the first and second order of derivatives of y. For convenience, curvature-induced-displacement (CID) is often used for characterizing the surface curvature of the mirror plate. The CID is defined as the displacement of the center of the mirror plate as shown in FIG. 4, and can be expressed as:

$$CID = \frac{1}{2} k \times \left(\frac{D}{2}\right)^2 \quad \text{(Eq. 5)}$$

In a simplified approximate, the curvature of the mirror plate can be simulated as parabolic, which can be written as:

$$Z(x, y, z) = Z_0 + \frac{1}{2} k[(x - x_0)^2 + (y - y_0)^2] \quad \text{(Eq. 6)}$$

wherein $Z(x,y,z)$ is a point in the curved surface of the mirror plate having Cartesian coordinates of x, y, and z. $Z_o$, $x_o$ and $y_o$ are constants, and k is the curvature defined in equations 1 and 4. Of course, the curvature of the mirror plate can be simulated in other suitable forms, such as a surface of a sphere.

According to an embodiment of the invention, the curvature of the mirror plate is characterized by CID. The CID can be obtained from the measured profile of the mirror plate surface. As a way of example, coordinates $Z(x, y, z)$ of the points in the reflective surface of the mirror plates can be measured from the interference fringes of the mirror plate surface. With the parabolic assumption of the mirror plate surface described in equation 6, the curvature k can be extracted using standard regression process. The regression process can be performed in many ways. As an example, a regression function $Z(x, y, z)$ can be defined as:

$$Z(x, y, z) = A + B(X^2 + Y^2) + CX + DY, \quad \text{(Eq. 7)}$$

$$\begin{cases} A = Z_0 \cdot \frac{k}{2}(x_0^2 + y_0^2) \\ B = \frac{k}{2} \\ C = -kx_o \\ D = -ky_o \end{cases} \quad \text{(Eq. 8)}$$

wherein

For the observed sets of points $Z_i(x_i, y_i, z_i)$ on the mirror plate surface, equations 7 and 8 can be written as the following equation 9.

$$\underbrace{\begin{bmatrix} \sum z_i \\ \sum z_i(x_i^2+y_i^2) \\ \sum z_i x_i \\ \sum z_i y_i \end{bmatrix}}_{E} = \underbrace{\begin{bmatrix} \sum(1) & \sum(x_i^2+y_i^2) & \sum x_i & \sum y_i \\ \sum(x_i^2+y_i^2) & \sum(x_i^2+y_i^2)^2 & \sum x_i(x_i^2+y_i^2) & \sum y_i(x_i^2+y_i^2) \\ \sum x_i & \sum x_i(x_i^2+y_i^2) & \sum(x_i^2) & \sum x_i y_i \\ \sum y_i & \sum y_i(x_i^2+y_i^2) & \sum(x_i y_i) & \sum(y_i^2) \end{bmatrix}}_{F} \cdot \underbrace{\begin{bmatrix} A \\ B \\ C \\ D \end{bmatrix}}_{G} \quad \text{(equation 9)}$$

or simplified as:

$$E = F \cdot G \quad \text{(Eq. 10)}$$

The term G can then be obtained from equation 10 as:

$$G = F^{-1} \cdot E \quad \text{(Eq. 11)}$$

wherein $F^{-1}$ is the inverse of the matrix F defined in equation 9.

By plugging in the extracted curvature k, $x_o$, $y_o$, and $z_o$ from the regression process described in equations 8, 9, 10, and 11 into equation 5, CID can thus be calculated. Obviously, the above method is based on the assumption that the curved surface of the mirror plate is parabolic. In other examples wherein the curved surface of the mirror plate complies with other forms, the curvature in those examples can be obtained in the same method, by simply substituting equation 6 with other proper expressions in which the coordinates Z (x, y, z) of the points in the mirror plate surface is explicitly or implicitly expressed as a function of the curvature k. The obtained curvature k can then by plugged in to equation 5 to obtain CID, which will not be discussed in detail herein.

Figure 5:
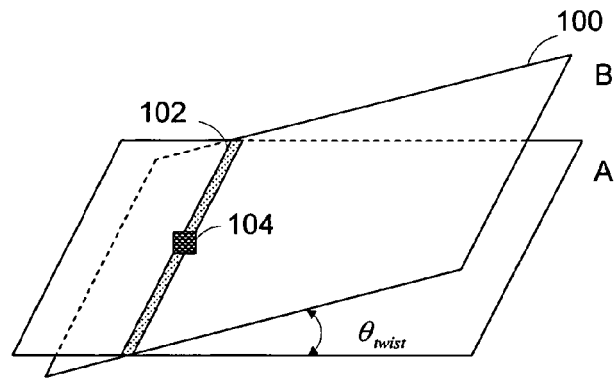
FIG. 5 illustrates the twist in a micromirror.
Figure 6:
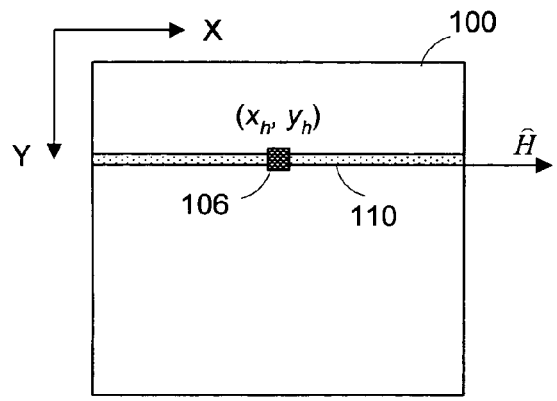
FIG. 6 illustrates a top view of the mirror plate in FIG. 5.
Figure 7:
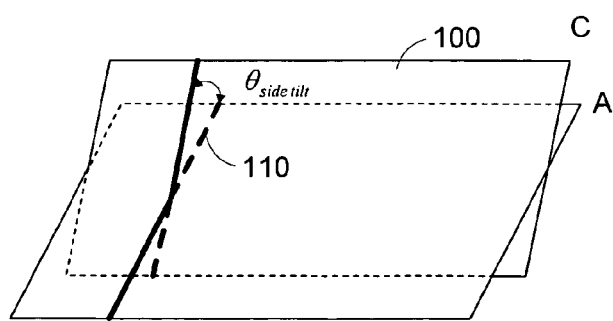
FIG. 7 illustrates the side tilt in a micromirror.

Other aspects to characterize the mirror plate can be twist and side tile, which are schematically illustrated in FIG. 5 to FIG. 7. Referring to FIG. 5, assuming position A is a desired state of the mirror plate. This desired state A can be the natural resting state wherein no external driving forces are exerted to the mirror plate. The desired state A can also be one of the operation states, such as the ON and OFF states. During the operation, the mirror plate is switched between the operation states (e.g. the ON and OFF states) frequently. The switches involve deformation of one or more deformable elements, such as the deformable hinge of the micromirror. After a period of operation, the desired position may be drifted due to many reasons, such as due to the accumulation of permanent residual deformation in the deformable hinge, and/or due to changes (or degradation) of the mechanical properties of the deformable hinge or the mirror plates. Such drift or the deviation of the mirror plate from the desired state A can be in any spatial directions, but all can be decomposed into two perpendicular directions—the drift along the direction perpendicular to the length of the deformable hinge (which is refereed to as twist), and the drift along the length of the deformable hinge that is shown in FIG. 7 (which is referred to as side tilt).

Referring again to FIG. 5, the twist, drift along the direction perpendicular to the length of the deformable hinge can be quantitatively described with angle $\theta_{twist}$ between the mirror plate at the desired position A and drifted position B. The twist angle $\theta_{twist}$ can be extracted from the observed profile of the mirror plate surface Z (x, y, z). The mathematical process can be better demonstrated in FIG. 6.

Referring to FIG. 6, attachment point 106 has the coordinate in the Cartesian coordinate of $(x_h, y_h)$. The length direction of the deformable hinge is denoted by $\hat{H}$. The X-Y plane of the Cartesian coordinate is defined as shown in the figure.

With the parabolic assumption of the mirror plate surface as defined in equation 6, the twist angle $\theta_{twist}$ can be expressed as:

$$\theta_{twist} = a\tan\lfloor(\nabla\cdot Z)|_{x_h,y_h}\cdot\hat{T}_w\rfloor \quad \text{(Eq. 12)}$$

wherein:

$$\nabla\cdot Z = k\times(X-x_o)\hat{x} + k\times(Y-y_o)\hat{y} \quad \text{(Eq. 13);}$$

$$\nabla\cdot Z|_{x_h,y_h} = k\times(x_h-x_o)\hat{x} + k\times(y_h-y_o)\hat{y} \quad \text{(Eq. 14);}$$

$$\hat{T}_w = -\hat{H}\times\hat{Z} \quad \text{(Eq. 15); and}$$

$\hat{Z}$ is the primary unit along Z axis in the Cartesian coordinate.

In one example, assuming the vectors of $\hat{H}$, $\hat{T}_w$, and $\hat{Z}$ are represented by:

$$\begin{cases} \hat{H} = [100] \\ \hat{T}_w = [010] \\ \hat{S}_T = [100] \end{cases} \quad \text{(Eq. 16)}$$

the twist angle $\theta_{twist}$ can be reduced to:

$$\theta_{twist} = \tan^{-1}[k(y_h-y_o)] \quad \text{(Eq. 17)}$$

By plugging the parameters of k, $y_o$ from the regress process described in equations 8, 9, 10, and 11 into equation 17, $\theta_{twist}$ can then be calculated.

The side tilt of the mirror plate as afore discussed can be quantitatively described with reference to FIG. 7. Referring to FIG. 7, mirror plate 100 may drift in the direction along the length of the deformable hinge (i.e. deformable hinge 110), and exhibit a residual angle θside tilt relative to the desired state A—that is $\theta_{side\ tilt}$ is the angle between the mirror plate at the drifted position C and the mirror plate at the desired position A.

The side tile angle $\theta_{side\ tilt}$ can also be calculated from the extracted parameters k, $y_o$ from the regression process described in equations 8, 9, 10, and 11. Specifically, $\theta_{side\ tilt}$ can be expressed as:

$$\theta_{side\text{-}tilt} = a\tan[(\nabla\cdot Z)|_{x_h,y_h}\cdot\hat{S}_T] \quad \text{(Eq. 18)}$$

wherein $\hat{S}_T$ is the vector along the direction of the side tilt. In the exemplary directions defined in equation 16, $\theta_{side\ tilt}$ can be reduced to:

$$\theta_{side\ tilt} = \tan^{-1}[k(x_h-x_o)] \quad \text{(Eq. 19)}$$

By plugging the extracted parameters k and $x_o$ from the regression process described in equations 8, 9, 10, and 11, $\theta_{side\ tilt}$ can then be calculated.

As discussed above, the characterization parameters of curvature k (and CID), twist angle $\theta_{twist}$, and side tilt angle $\theta_{side\ tilt}$ are calculated from the extracted parameters from a regression process based upon a pre-defined model, while the regression is performed on the measured coordinates $Z_i$ ($x_i$, $y_i$, $z_i$) of the points on the surface of the mirror plate. Therefore, accurate measurement of the mirror plate surface is of critical importance.

The present invention provides a method of accurately measuring the profile of the mirror plate surface using interference fringes. And the methods of the invention can be applied to micromirrors on the wafer-level, as shown in FIG. 8.

Figure 8:
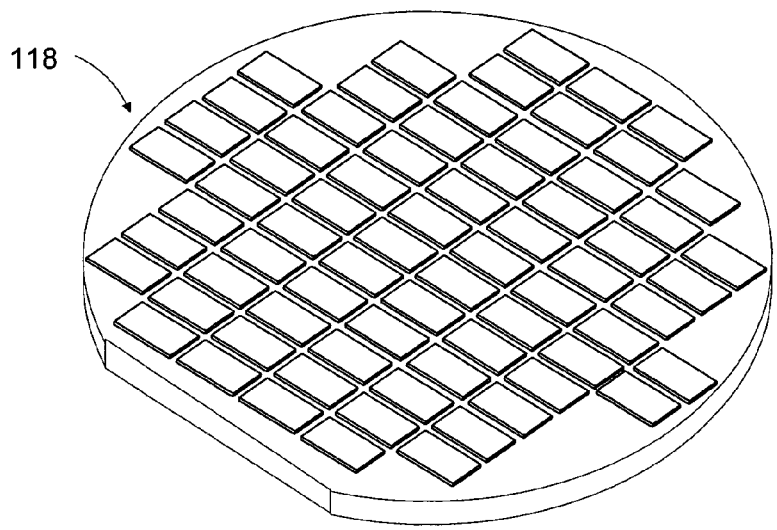
FIG. 8 illustrates a wafer comprising a plurality of dies each having an array of micromirrors.

Referring to FIG. 8, the micromirrors are often fabricated on wafers, especially in industrial manufacturing, it is certainly advantages to perform the measurement on the wafer level during the fabrication (but after the mirror plates have been fabricated, while not necessarily released by removing the sacrificial materials). For demonstration purposes, only a number of dies are illustrated in wafer 118. In practical fabrications, each wafer may have different number of dies. The wafer can be a light transmissive substrate such as glass, quartz, and sapphire, or can be a standard semiconductor wafer on which standard integrated circuits can be fabricated, depending upon the specific design of the micromirrors as discussed earlier with reference to FIGS. 1 to 3. Alternatively, the wafer can be a single crystal, such as single crystal silica.

Figure 9:
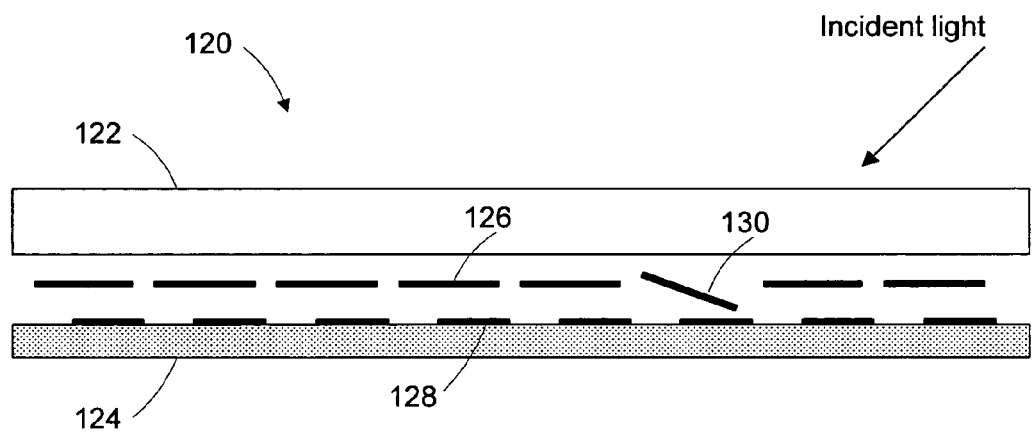
FIG. 9 illustrates a cross-sectional view of a die in the wafer in FIG. 8.

Each die on wafer 118 comprises an array of deflectable reflective mirror plates. One of the examples of a die in wafer 118 is illustrated in FIG. 9. Referring to FIG. 9, an array of deflectable reflective mirror plates (e.g. mirror plate 126) is fabricated in a space between substrates 122 and 124. For demonstration and simplicity purposes, only eight mirror plates are illustrated in the figure. Oftentimes, the micromirror array device has more micromirrors. For example, when the micromirror array device is a portion of a spatial light modulator of a display system, it may have millions of micromirrors, the number of which determines the resolution of the display system. For example, the spatial light modulator may have a resolution of 1024×768 or higher, or 1280×1024 or higher, or 1640×1280 or higher. Of course, the micromirror array device may have a fewer number of micromirrors than in display, or other applications.

For addressing and deflecting the mirror plates, an array of addressing electrodes is disposed proximate to and associated with the mirror plates. Each mirror plate may have only one single addressing electrode, or alternatively multiple addressing electrodes. In addition to the addressing electrodes, other electrodes, such as electrodes for pulling the mirror plates towards a direction opposite to the direction along which the addressing electrodes drive the mirror plates can be provided, for example, on substrate 122.

The mirror plates can be fabricated on substrate 122 that is transmissive to the incident illumination light, in which instance, substrate 122 is bonded to substrate 124, on which substrate the addressing electrodes are fabricated. Alternatively, the mirror plates can be fabricated on the same substrate as the addressing electrodes, such as substrate 124. In this instance, light transmissive substrate may not be necessary. However, light transmissive substrate can be provided during the characterization process for protecting the deflectable reflective mirror plates, and such protective light transmissive substrate need not to be bonded to substrate 124.

In addition to wafer level, the characterization process of the present invention can also be performed on die level, for example, on individual dies. Moreover, the characterization process can be performed even for micromirror array devices in a package, as shown in FIG. 10.

Figure 10:
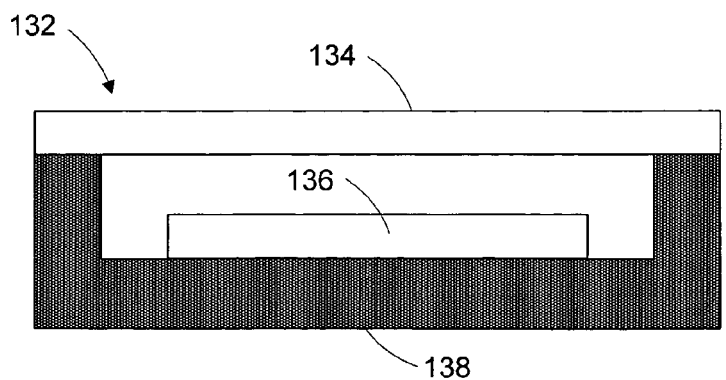
FIG. 10 illustrates a cross-sectional view of a micromirror array device package with a light transmissive package cover.

Referring to FIG. 10, micromirror array device having an array of deflectable reflective mirror plates are enclosed within a space between package substrate 138 and package cover 134. The package cover comprises a portion through which the incident light can pass and illuminate the reflective surfaces of the reflective deflectable mirror plates.

The sizes of the mirror plates of the micromirrors in the micromirror array device are typically in the order of microns. For example, the micromirror array can be constructed having a pitch (the center-to-center distance between adjacent micromirrors) of 25 micrometers or less, or 10.16 micrometers or less, or from 4.38 to 15 micrometers, such as from 4.38 to 10.19 microns. The gap between adjacent micromirrors is approximately of 0.5 micrometers or less, or from 0.1 to 0.5 micrometer. And the mirror plate of the micromirror has a dimension of from 20 micrometers to 10 micrometers. To precisely measure the profile of individual mirror plate in the micromirror array, the measurement system is required to have compatible resolutions, such as the resolution in the order of microns. Moreover, it is desired that that the measurement system is capable of performing the desired measurement through light transmissive substrate, such as the light transmissive substrate 122 in FIG. 9 and/or light transmissive substrate 134 in FIG. 10. Given these constraints and expectations, the present invention uses an interferometer to measure the profiles of the individual mirror plates through interference fringes.

Figure 11:
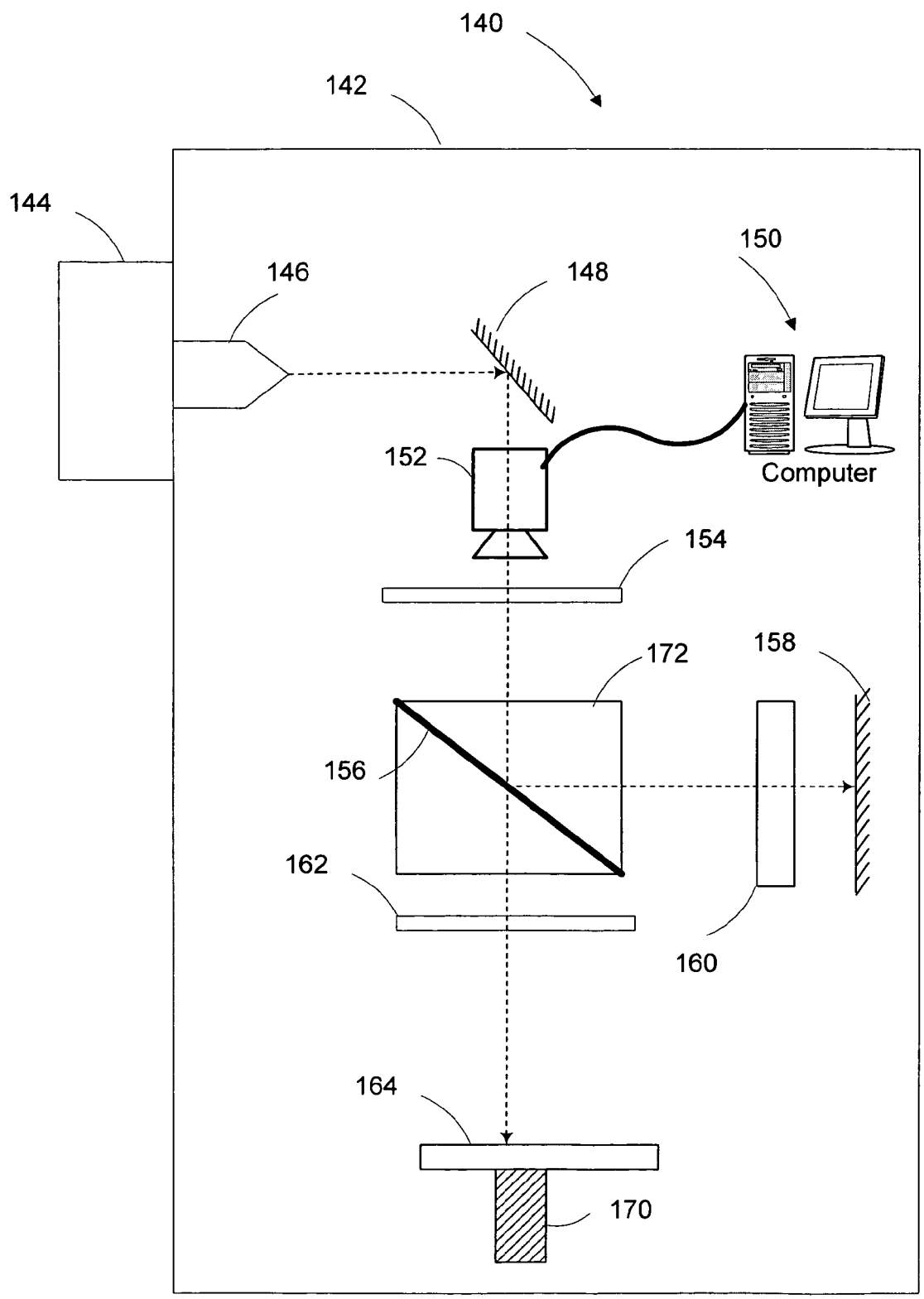
FIG. 11 schematically illustrates an exemplary setup for characterizing microelectromechanical devices with movable elements.

Turning to FIG. 11, an exemplary measurement system according to the invention is schematically illustrated therein. Measurement system 140 comprises chamber 142 in which the system components and the sample can be hosted. Specifically, the chamber can be a vacuum chamber and connected to a vacuum pump and necessary valves to provide desired vacuum in the chamber if the measurement is to be performed in vacuum. Chamber 142 can also be connected to protection gas sources, such as inert gas for on one hand, helping in adjusting the pressure inside the chamber, and on the other hand, providing protection gases for the samples to be measured.

Light source 144 is attached to chamber 142 and connected to projection lens 146. The projection lens can be a standard and commercially available projection lens but with a magnification of 5 times or higher, such as 10 times or higher, 20 times or higher, 50 times or higher, and 60 times or higher. Accordingly, the resolution of the system can be 10 microns or higher, such as 1 micron or higher. The illumination light can be any suitable light, such as white light, a monochromic light, and laser. Even through the laser light beam is highly phase-coherent, it may generate far more detailed interference fringes than those of interests. Therefore, white light beam is preferably used in the measurement system. The light beam enters into the chamber and is directed to reflection mirror 148, after reflection from which, the light beam travels to beam splitter house 172. The beam splitter house 172 comprises beam splitter 156 that splits the incident light beam from reflection mirror 148 into two beams. One of the split two beams is directed to reference mirror 158 through compensation lens 160 and reflected back by the reference lens. The other split beam is directed to the reflective surfaces of the mirror plates in micromirror array device 164, and reflected thereby. The reflected light beams from the surfaces of the mirror plates and reference mirror are joint together, and collected by photodetector 152, such as a CCD camera. The two reflected beams then generate an interference fringe on the display target of the CCD camera. The structure of the interference fringe carries the information of the reflective surface profiles of the mirror plates being measured. Specifically, the coordinates $Z_i$ ($x_i$, $y_i$, $z_i$) in equations 9, 12, 13, 14, and 18 can be extracted from the fine structures of the interference fringe. This can be carried put in computing device 150 that is connected to the photodetector.

In order to generate interference fringes that require phase coherency of the reflected beams from the reference mirror and reflective surfaces of the mirror plates being measured, either of the reference mirror (158) and micromirror array device 164 or both are movable relative to beam splitter 156, as discussed in US patent application "INTERFEREOM-ETERS OF HIGH MAGNIFICATIONS" to Grasser, attorney docket number P239-US filed with this patent application, the subject matter being incorporated herein by reference.

In an embodiment of the invention, the reference mirror fixed, while micromirror array device 164 is movable in relation to beam splitter 156. The movement of the micromirror array device is achieved by attaching the micromirror array device to the supporting surface of sample holder 170, wherein the supporting surface can be moved relative to the beam splitter by a micro-actuator, such as piezo-actuators (e.g. piezoelectric actuators of lead zirconium titanate) and micro-step motors (not shown in the figure).

In operation, an image of the reflective surfaces of the mirror plates is obtained. Such image may or may not comprise the interference fringes. If the image does not have a clear interference fringe, the micromirror array device is moved relative to the beam splitter so as to adjust the optical path of the reflected light from the reflective surfaces of the mirror plates for maintaining the phase-coherency of the reflected beams from the mirror plates and from the reference mirror.

When the micromirror array device is moved, the image of the reflective surfaces of the mirror plates on the photodetector may be blurred. This can be corrected by moving compensation lens 162 relative to the beam splitter.

As an alternative feature, compensation lens 154 and 158 can be provided. Compensation lens 154 is designated for compensating aberrations resulted from the interior reflecting surfaces of the beam splitting house 172, and compensation lens 160 is designated for compensating aberrations from the reference mirror. Alternatively, compensation lens 162 can be made to include a feature for correcting aberrations resulted from the elements of the micromirror array device, such as from the light transmissive substrate(s) or other members of the micromirror array device, as set forth in US patent application "Interferometers with High Magnifications" to Grasser, filed with the present patent application, the subject of which being incorporated herein by reference.

Figure 12:
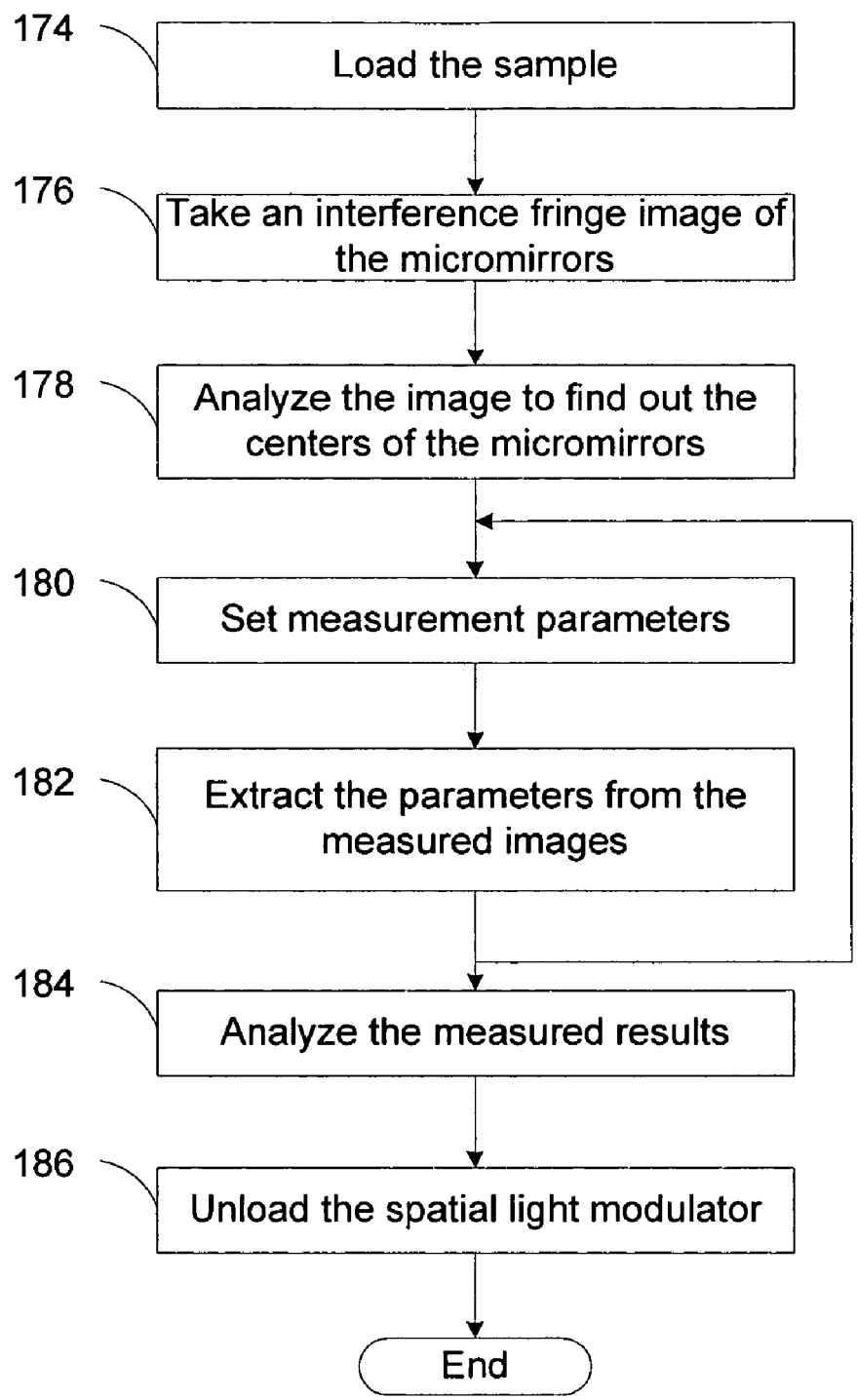
FIG. 12 is a flow chart showing the steps executed in performing the characterization using the setup of FIG. 11.

As a way of example, FIG. 12 is a flow chart showing the steps executed in performing a characterization process according to an embodiment of the invention. Referring to FIG. 12, the sample is loaded into the measurement system, for example, by attaching the sample to the sample holder (step 174). The sample can be a micromirror array device, such as a spatial light modulator having an array of micromirror devices. Such micromirror array device may or may not be in a package as shown in FIG. 10.

Alternatively, the sample can be a wafer having multiple dies as shown in FIG. 8 with each die comprising an array of deflectable reflective mirror plates. In the instance when the mirror plates are formed on a light transmissive substrate, and the addressing electrodes are formed on a semiconductor substrate, the wafer in FIG. 8 can be a light transmissive wafer. Such wafer needs to be assembled by bonding to the semiconductor wafer having a plurality of dies with each die having an array of addressing electrodes. The sample loaded in the measurement system can be the light transmissive substrate before assembly. In particular, the sample can be the light transmissive wafer before or after the mirror plates being released by removing the sacrificial materials. Alternatively, the sample loaded into the measurement system can be the light transmissive wafer after being assembled to the semiconductor wafer having the plurality of addressing electrode dies.

In the instance wherein the micromirrors and addressing electrodes are formed on the same substrate such as the semiconductor substrate, the wafer in FIG. 8 can be a semiconductor wafer. The mirror plates on this semiconductor wafer may or may not be released by removing the sacrificial materials. In either example, a protective light transmissive substrate can be disposed on top of the reflective mirror plates during measurement.

Figure 14:
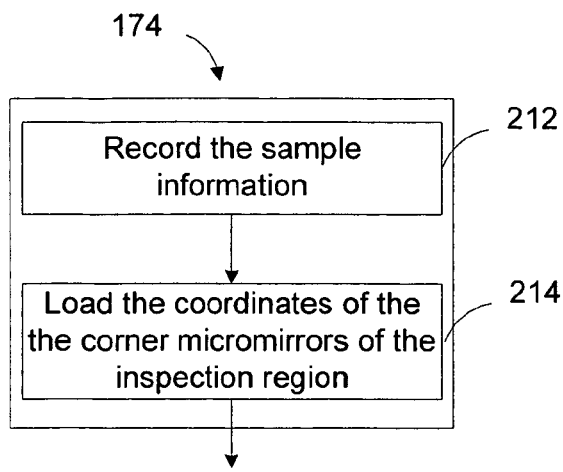
FIG. 14 is a flow chart showing the steps executed in the characterization process.

Before loading the sample into the measurement system, the sample information may be recorded, which is illustrated in flow chart of FIG. 14. Referring to FIG. 14, the sample information, such as the identification number of the sample is recoded (step 212). As an alternative feature, the coordinates of the micromirrors at the corners of the inspection region are saved such that each micromirror in the inspection region can be located (step 214). When combined with other parameters, such as the pitch sizes along the column and row, the coordinates of each micromirror in the inspection region can then be determined. This is of particular importance when the measurement is to be performed automatically with the computing device, in which case, the computing device is capable of measuring the micromirrors sequentially based on the coordinates of the micromirrors. However, this step (step 214) can also be performed after obtaining a clean interference fringe image of the mirror plates at step 176 in FIG. 12.

Referring back to FIG. 12, after loading the sample into the measurement system, an interference fringe image of the reflective surfaces of the mirror plates is captured in the photodetector (step 176). Specifically, an image of the mirror plates can first be obtained. Such image may or may not have the interference fringe of the mirror plates depending upon the difference of the optical paths of the reflected light from the mirror plates and reference mirror. If no interference fringes are observed in the captured image, the relative position of the sample to the beam splitter can be adjusted through the micro-actuator in the sample holder until the interference fringe of the mirror plates is observed. However, the captured image with the interference fringe may not be clear due to the movement of the sample, which shifts the focal plane away from the display screen in the photodetector. This can be corrected by moving compensation lens 162 in FIG. 11 relative to the beam splitter until a clear image with the interference fringe is observed.

Figure 13:
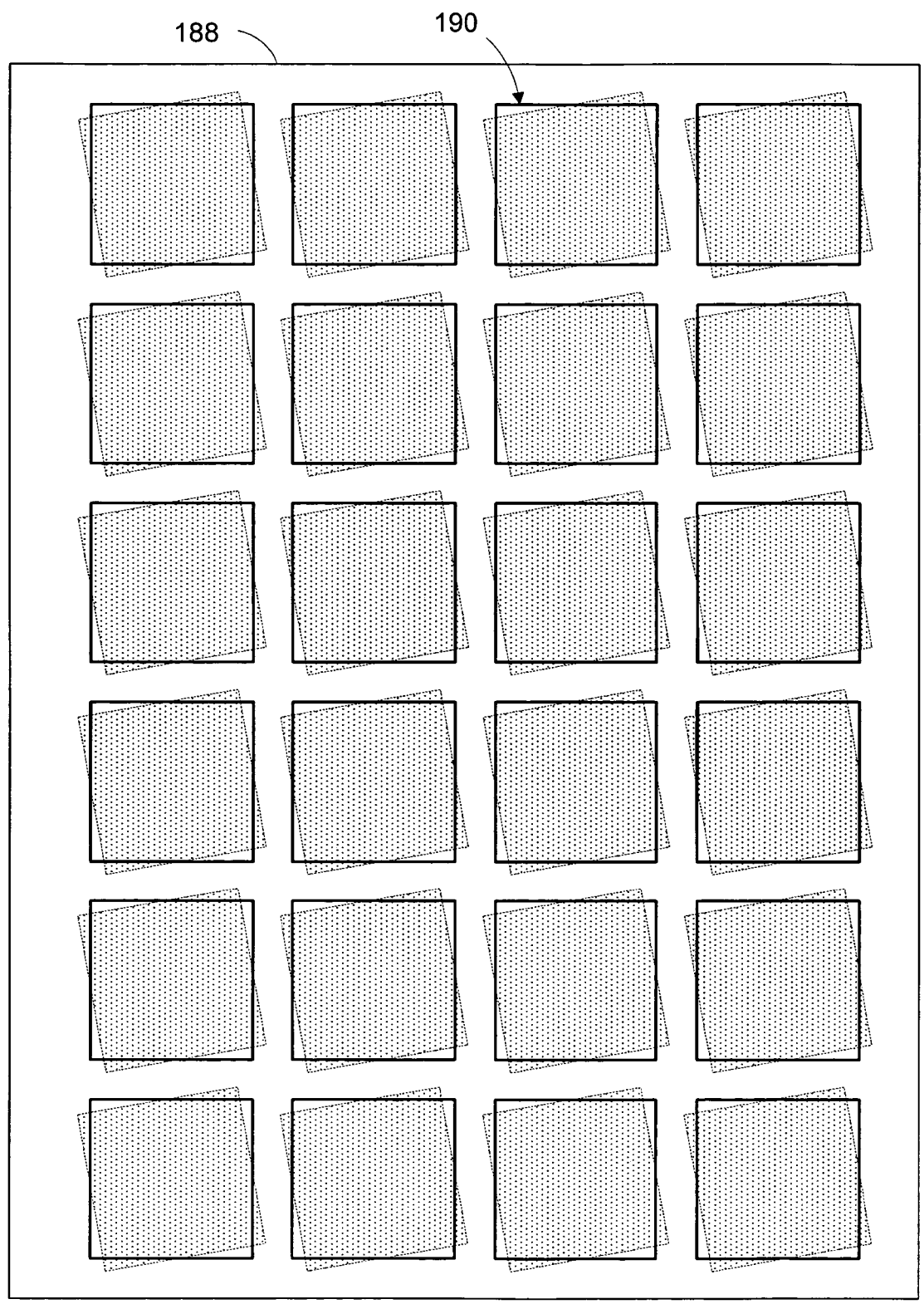
FIG. 13 schematically illustrates an exemplary image of an array of micromirror devices captured in the setup in FIG. 11.

As a way of example, FIG. 13 demonstratively illustrates a captured interference image of the reflective surfaces of the mirror plates. Referring to FIG. 13, the captured images of the mirror plates are shown in areas filled with dots. For simplicity and demonstration purposes, only 24 images of the mirror plates are shown in the figure. In this image, the mirror plates are tilted around their geometric centers, such as those shown in FIG. 21 which will be discussed in detail afterwards.

Figure 15:
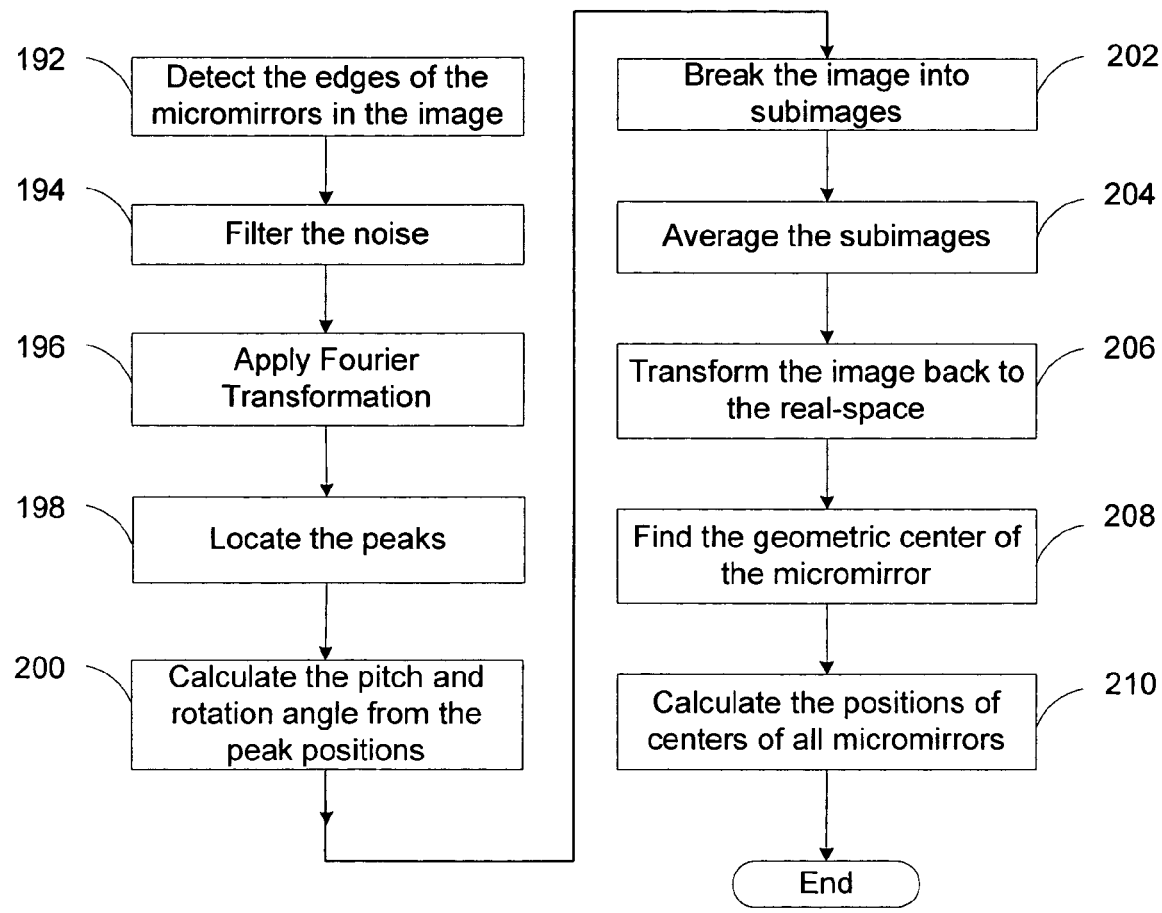
FIG. 15 is a flow chart showing the steps executed in performing image analyses of the flow chart in FIG. 12.

Given the interference fringe image of the reflective deflectable mirror plates, the geometric center of each mirror plate is determined (step 178). The geometric centers of the mirror plate can be determined in many ways, one of which is demonstrated in the flow chart shown in FIG. 15. Referring to FIG. 15, the edge of each mirror plate in the captured image is detected (step 192). The edge detection of an image can be accomplished in many ways. According to an embodiment of the invention, a Siebel operator is applied to the captured image for the purposes of edge detection. After the edge detection, both horizontal and vertical edges of the image cells corresponding to the reflective mirror plates are obtained.

Following the edge detection step 192, noise filtering step 194 can be alternatively performed so as to remove or reduce the background noise of the captured image. The captured image after noise reduction is then transformed into the Fourier space after the Fourier transformation step 196. In the Fourier space, the peaks of the image are located (step 198). Given the peak positions, the pitches and rotation angles of the reflective mirror plates are calculated in the Fourier space (step 200) with the pitch sizes include both pitch sizes along vertical and horizontal directions. Such calculated pitch sizes may be different at different locations in the image. As an optional feature, a plurality of pitch sizes at different locations of the image can be calculated and then averaged. Such averaged pitch size can be used as the pitch sizes of the entire micromirror array. Specifically, the image can be divided into sub-images (step 202). Then the pitch sizes in the sub-images are averaged at step 204. With the calculated pitch sizes and the detected edges of the image cells of the individual micromirrors, the geometric centers are determined at steps 208 and 210. According to the embodiment, the geometric center detection is performed in the real-space. Therefore, the Siebel transformation following the Fourier transformation is applied to the image so as to transform the image from the Fourier space back into the real-space (step 206). At step 207, the geometric centers are detected. Given the geometric centers, the edges, and the pitch sizes of the image cells of the individual micromirrors, the positions of the centers of all micromirrors of the micromirror array device in the measurement system can be calculated (step 210).

The accuracy of the calculated geometric centers of the reflective mirror plates after step 192 to step 210 can be further improved by matching the edges and geometric centers of the mirror plate images with a calibration grid, as demonstrated in FIG. 13. Referring again to FIG. 13, assuming the areas filled with dots are images of the reflective mirror plates after edge detection and geometric center determination, calibration grid 190, which comprises an array of calibration blocks, is superpositioned to the captured image. The size of the each calibration block can be pre-determined, however, is dynamically adjustable during matching according to the matching result. Specifically, if the calibration blocks matches captured images of the reflective mirror plates, the geometric centers of the calibration blocks are used as the real geometric centers of the reflective mirror plates. The match can be quantitatively evaluated by a predetermined criterion. For example, if 90% or higher, such as 99% or higher of the geometric centers of the calibration blocks are coincident with the calculated geometric centers of the mirror plate images, it is treated that the calibration blocks match the mirror plate image, and the geometric centers of the mirror plates are the corresponding geometric centers of the calibration blocks. Otherwise, the geometric centers of the calibration blocks are adjusted by, for example, adjusting the sizes of the calibration blocks and/or the geometric centers of the calibration blocks until the calibration blocks match the mirror plate image.

The calibration blocks illustrated in FIG. 13 is one example. The calibration blocks can be in other suitable forms. For example, the calibration blocks can be nets of a grid, wherein adjacent calibration blocks are boarded leaving no gaps therebetween. The calibration blocks can be in other suitable shapes, such as circles or triangles, and titled squares. According to another embodiment of the invention, historical information of similar mirror plate images can be used in configuring the calibration blocks.

For example, the configuration of the calibration blocks from a previous successful matching of a sample that is similar (e.g. the designed shape of the mirror plates is similar or identical) to the current sample being measured can be used as a reference to the configuration of the calibration blocks for the current sample being measured.

After accurately identifying the geometric centers of the individual mirror plates of the sample being measured, a plurality of measurement parameters is set (step 180). For example, the CID, twist angle $\theta_{twist}$, and side tilt angle $\theta_{side\ tilt}$ are selected to be extracted from the interference fringe image after image processing. The initial values of the measurement parameters, if any, can also be respectively assigned. At step 182, the measurement parameters are then extracted from the captured interference fringe images of the mirror plates according to the equations 1 to 17 as discussed previously, which will not be repeated herein. This extraction process can be performed in computing device 150 in FIG. 11. Specifically, the computing device comprises a computer readable medium having computer readable instructions for performing the parameters extraction process. In fact, the computing device can also be assigned to perform all measurement steps (e.g. steps 176 to 184 in FIG. 12) after the sample being loaded into the measurement system.

The computing device can be of variety of configurations. In a simplified configuration, the computing device may comprise a central processing unit and a storage medium. The storage medium can be removable and non-removable media implemented in any method or technology for storage of information such as computer readable instructions, data structures, program modules or other data. The memory, the removable storage and the non-removable storage are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device.

Additionally, the computing device may also have other features and/or functionality. For example, the computing device can also include additional removable and/or non-removable storage including, but not limited to, magnetic or optical disks or tape, as well as writable electrical storage media.

The computing device may also contain one or more communications connections 190 that allow the device to communicate with other devices. The communications connections carry information in a communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

For facilitating the automatic control of the measurements system for executing the desired measurement procedures with the computing device, a set of User-Interfaces (UI) can be provided according to the invention. The user-interface enables the user to select the parameters being measured (such as the CID, twist angle $\theta_{twist}$, and side tilt angle $\theta_{side\ tilt}$), assigning the initial values to other parameters usable for controlling the measurement system to perform the automated measurement and the consecutive data analyses, data acquisition for the selected measurement parameters, and the following analyses of the acquired data. In particular, other features may be implemented and activated as appropriate during the data acquisition to help the user. For example, images of the mirror plates, or any intervening images during image processes can be displayed in a display screen connected to the computing device.

Referring back to FIG. 12, the selected measurement parameters, such as CID, twist angle $\theta_{twist}$, and side tilt angle $\theta_{side\ tilt}$ are then analyzed. The results from analyses can be used in many aspects of the fabrication. For example, when the sample being measured is a sample needs following process, such as removing the sacrificial material, surface treatment (e.g. surfaces mono-layer coating to reduce stiction) and packaging, the analysis results can be used as a reference for determining whether the sample is qualified for receiving the following process in view of the cost-efficiency and production yield. Such analysis results can also be used for other purposes, such as technology development.

When the sample being measured is a wafer having plurality of dies before assembly to another wafer, with each die comprising an array of reflective mirror plates, the analysis results can be used as a reference to determining identifying the "bad" or "good" dies on the wafer. In the following wafer level assembly wherein the assembly is performed on wafers, positions of the identified "bad" and "good" dies on the wafer can be used as the basis for performing the statistical die matching, as set forth in U.S. patent application Ser. No. 10/875,987 filed Jun. 23, 2004, the subject matter being incorporated herein by reference in entirety.

The analysis results, along with the associated sample information (e.g. the sample identification) can be stored in a storage medium, such as a storage medium in the computing device connected to the measurement system and other movable or non-movable storage media, which is not shown in FIG. 11.

Referring again to FIG. 12, the sample is unloaded from the measurement system after the measurement (step 186). The sample also can be unloaded before performing the analysis of the measured results at step 184, or before step 182 wherein the selected parameters are extracted.

The measurement process as discussed above is one example wherein a particular region of a micromirror array device is characterized. Such measurement can be repeated on micromirrors across the entire micromirror array, and/or across all dies on a wafer. In a typical example, an inspection area (the area of the captured image of the micromirrors) may comprise 20×15 micromirrors in a micromirror array (i.e. a die on a wafer if the measurement is performed for micromirrors on wafer level). For characterization purposes, seven or more regions are sampled and then characterized to statistically reflect the entire micromirror array. When the measurement is performed for micromirrors on wafer level comprising a plurality of dies, all dies can be characterized. Alternatively, only a group of sampled dies on the wafer is characterized to statistically reflect the quality of the entire wafer.

Figure 16:
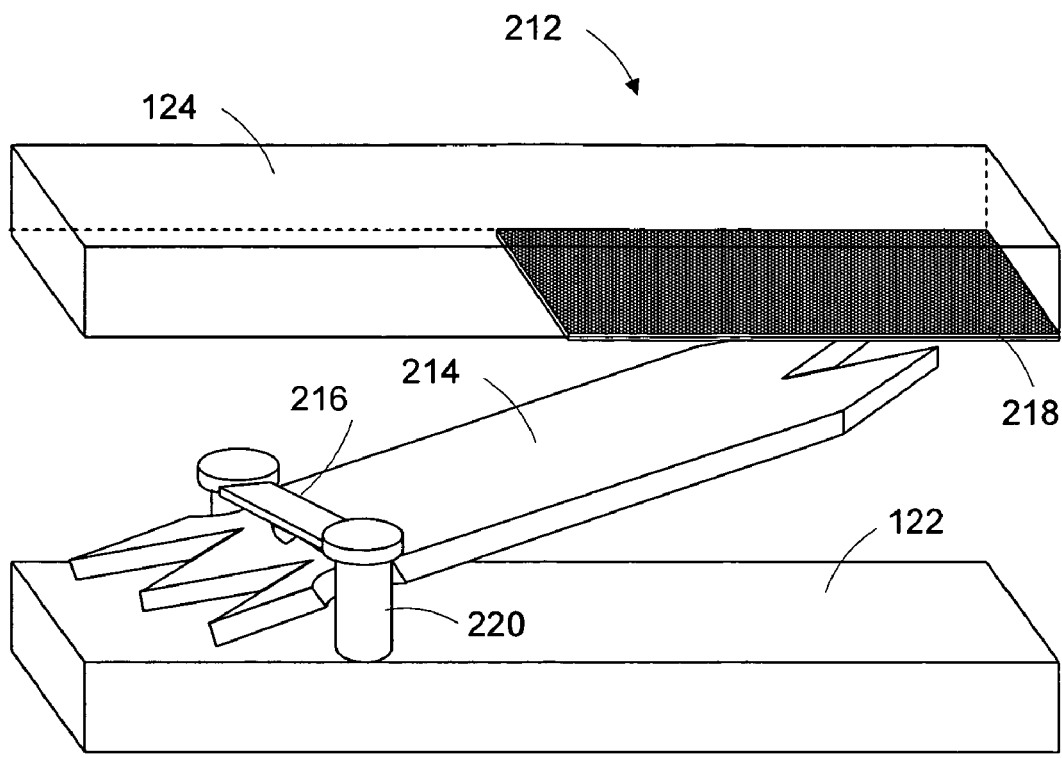
FIG. 16 illustrates a perspective view of an exemplary micromirror device.

The methods and measurement system as discussed above can be applied to measurements of a variety of micromirror array devices, one of which is illustrated in FIG. 16. Referring to FIG. 16, micromirror device 212 comprises substrate 122 that is a light transmissive substrate (e.g. glass, quartz and sapphire) and semiconductor substrate 124. Deflectable and reflective mirror plate 214 is spaced apart and attached to deformable hinge 216 via a hinge contact. The deformable hinge is affixed to and held by posts 220. The semiconductor substrate has addressing electrode 218 for deflecting the mirror plate. In this particular example, the light transmissive substrate operates as a stopper for stopping the rotation of the mirror plate at the ON state.

Figure 17:
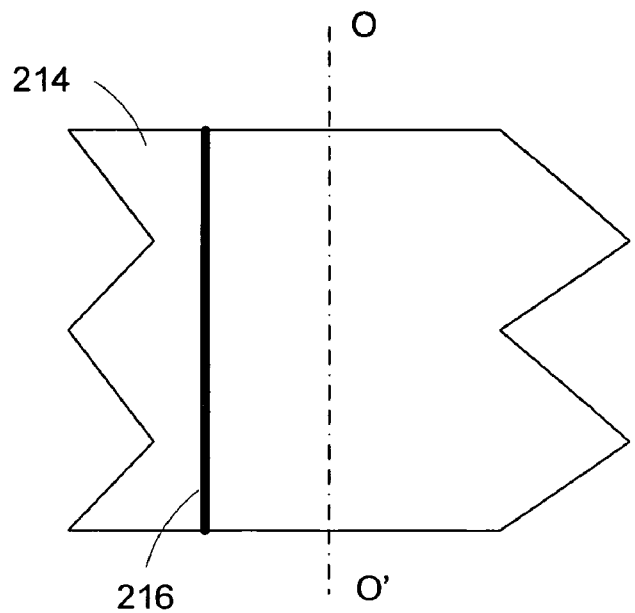
FIG. 17 illustrates a top view of the mirror plate of FIG. 16.

A top view of the micromirror in FIG. 16 is illustrated in FIG. 17. As can be seen in FIG. 17, deformable hinge 216 is not along but offset from the symmetrical axis OO' of the mirror plate such that the mirror plate is operable to rotate asymmetrically. The deformable hinge is located beneath the mirror plate in the direction of the incident light. That is, the mirror plate is located between the light transmissive substrate and the deformable hinge such that the deformable hinge is not illuminated by the incident light so as to prevent unexpected light scattering from the deformable hinge, thereby, increasing the contrast ratio of the produced image. The quality of the produced image is further improved through reduction of the light scattering from the edges of the mirror plate by forming the edges of the mirror plate into zigzagged shape, as shown in the figure.

The deflectable and reflective mirror plate can be a multi-layered structure. For example, the mirror plate may comprise an electrical conducting layer, a reflective layer that is capable of reflecting 85% or more, or 90% or more, or 85% or more, or 99% or more of the incident light (e.g. incident visible light), a mechanical enhancing layer that enhances the mechanical properties of the mirror plate. For example, the mirror plate may comprise a $SiO_2$ layer, an aluminum layer, a titanium layer, and a titanium nitride layer. When the aluminum layer is to be deposited on the $SiO_2$ layer, diffusion between the aluminum layer and $SiO_x$ layer may occur. This can be avoided by depositing a barrier layer therebetween.

Figure 18:
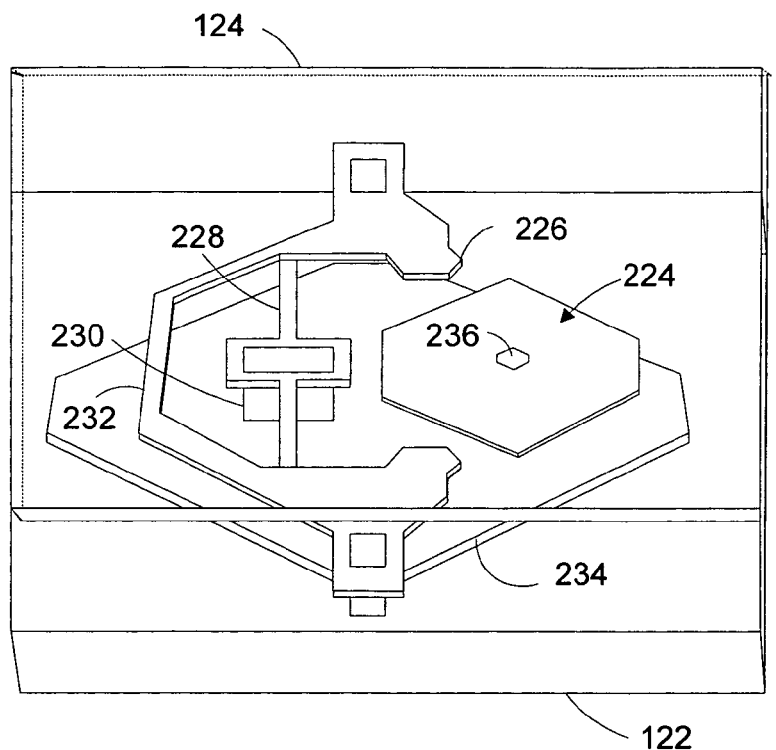
FIG. 18 illustrates another exemplary micromirror device.

Another exemplary micromirror device is illustrated in a perspective view in FIG. 18. Referring to FIG. 18, deflectable reflective mirror plate 234 with a substantially square shape is formed on light transmissive substrate 122, and is attached to deformable hinge 228 via hinge contact 230. The deformable hinge is held by hinge support 232, and the hinge support is affixed and held by posts on the light transmissive substrate. For electrostatically deflecting the mirror plate, an addressing electrode (not shown in the figure for simplicity purposes) is fabricated in the semiconductor substrate 124. For improving the electrical coupling of the deflectable mirror plate to the electrostatic field, extending metallic plate 224 can be formed on the mirror plate and contacted to the mirror plate via post 236.

Figure 19:
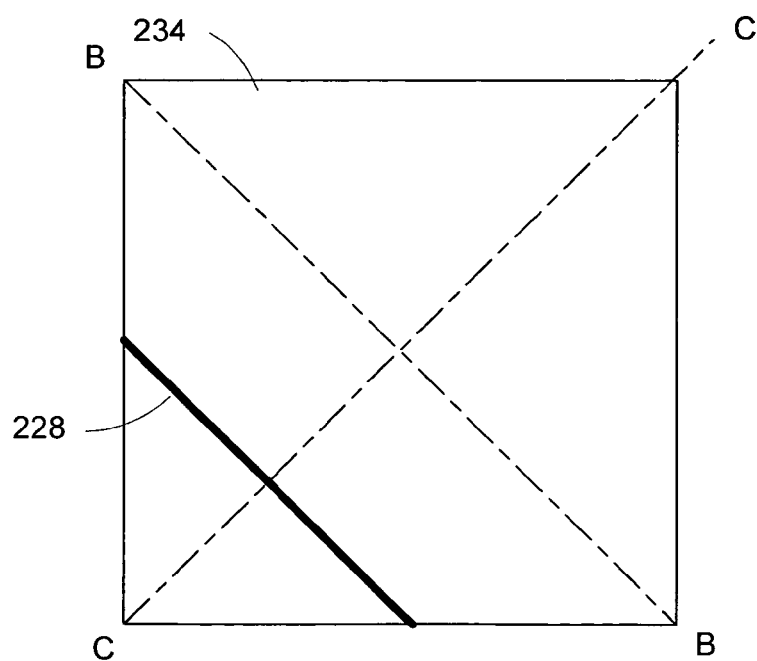
FIG. 19 illustrates a top view of the deflectable reflective mirror plate of the micromirror in FIG. 18.

The mirror plate is preferably attached to the deformable hinge asymmetrically such that the mirror plate can be rotated asymmetrically in favor of high contrast ratio. The asymmetric attachment is better illustrated in FIG. 19. Referring to FIG. 19, mirror plate comprises diagonals BB and CC. Deformable hinge is disposed with its length parallel to a diagonal (e.g. BB) of the mirror plate. However, the length of the deformable is not along any diagonal of the mirror plate in the top view when the mirror plate is parallel to the light transmissive substrate. Of course, the mirror plate can be attached to the deformable hinge symmetrically by placing the attachment point around the geometric or mass center of the mirror plate, which will not be discussed in detail herein.

Similar to that in FIG. 17, the deformable hinge is preferably formed beneath the deflectable mirror plate in the direction of the incident light so as to avoid unexpected light scattering by the deformable hinge. For reducing unexpected light scattering of the mirror plate edge, the illumination light is preferably incident onto the mirror plate along a corner of the mirror plate.

Figure 20:
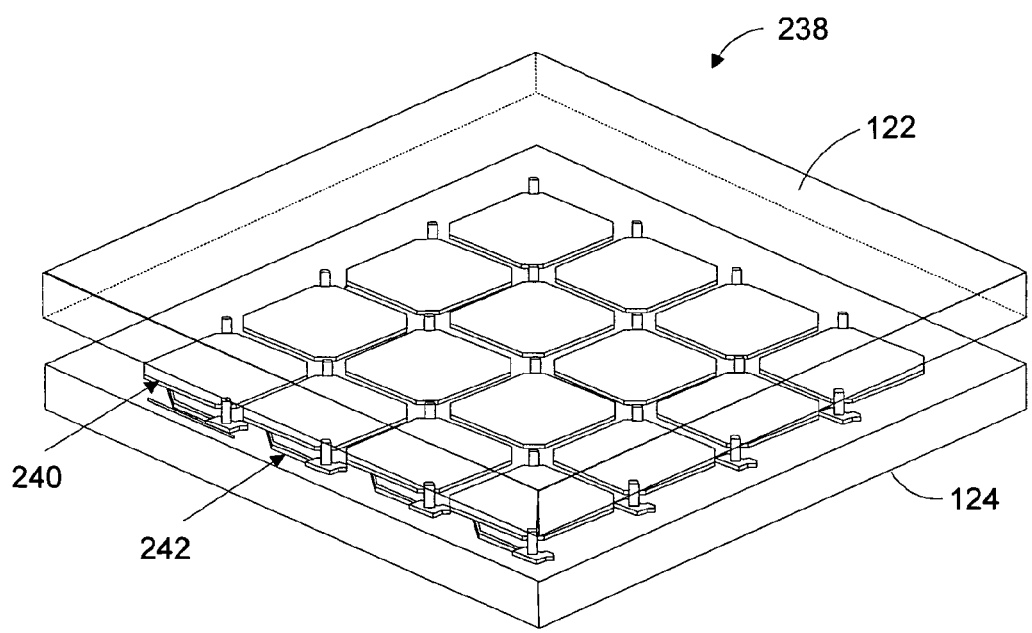
FIG. 20 illustrates an exemplary micromirror array device.

Referring to FIG. 20, an exemplary spatial light modulator having an array of micromirrors is illustrated therein. For simplicity purposes, only 4×4 micromirrors are presented. In this example, micromirror array 240 is formed on light transmissive substrate 122; and addressing electrode and circuitry array 242 is formed on semiconductor substrate 124 for deflecting the micromirrors in the micromirror array. The deformable hinges of the micromirrors, as well as the addressing electrodes are hidden from the incident light.

Figure 21:
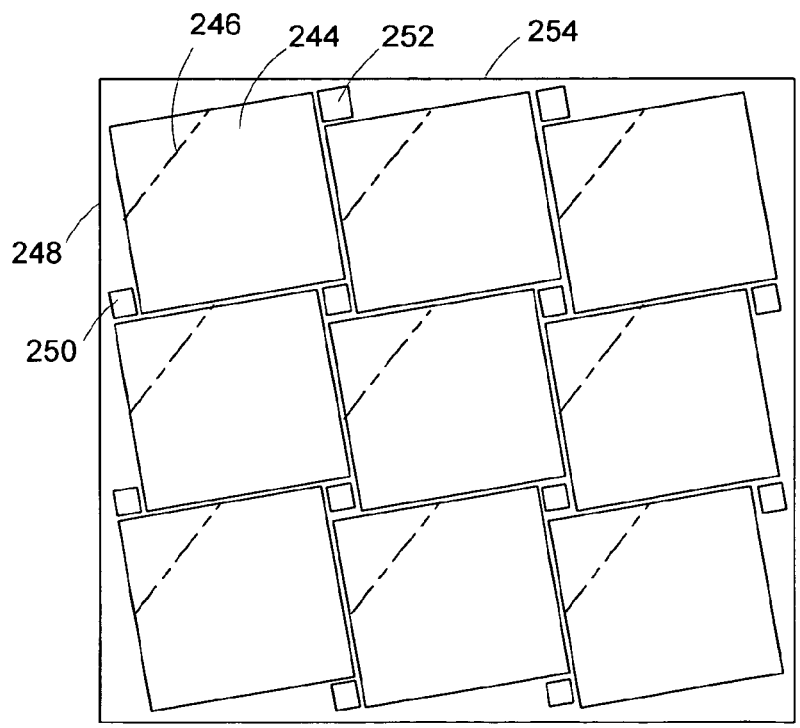
FIG. 21 illustrates a top view of another exemplary micromirror array device.

The micromirrors in the micromirror array of the spatial light modulator can be arranged in alternative ways, another one of which is illustrated in FIG. 21. Referring to FIG. 21, each micromirror is rotated around its geometric center an angle less than 45° degrees. The posts (e.g. 250 and 252) of each micromirror (e.g. mirror 244) are then aligned to the opposite edges of the mirror plate. No edges of the mirror plate are parallel to an edge (e.g. edges 254 or 248) of the micromirror array. The rotation axis (e.g. axis 246) of each mirror plate is parallel to but offset from a diagonal of the mirror plate when viewed from the top of the mirror plate at a non-deflected state.

Figure 22:
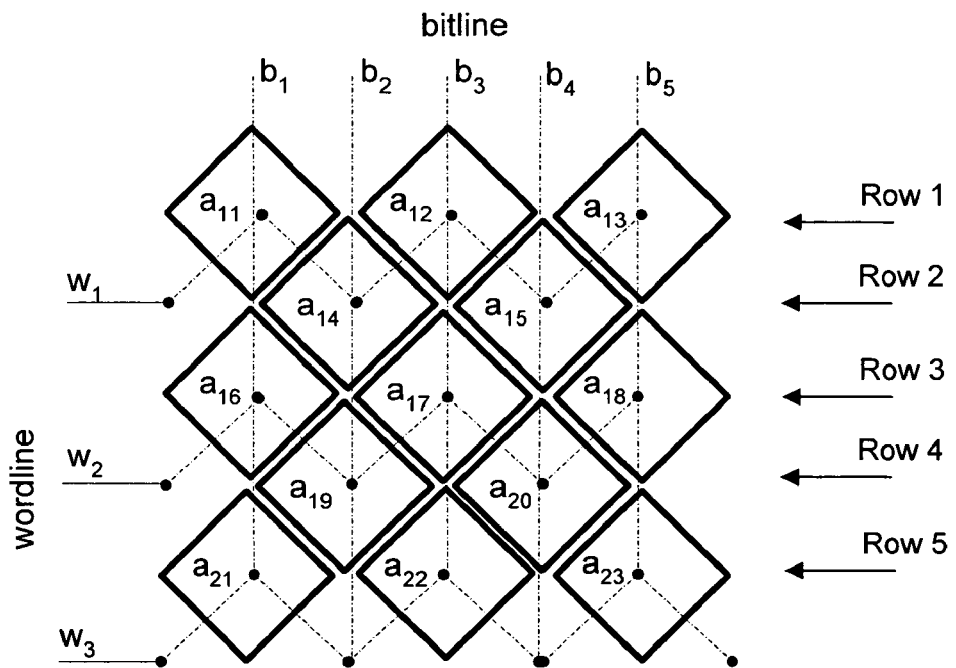
FIG. 22 illustrates a top view of yet another exemplary micromirror array device.

FIG. 22 illustrates the top view of another micromirror array. In this example, each micromirror is rotated 45° degrees around its geometric center. For addressing the micromirrors, the bitlines and wordlines are deployed in a way such that each column of the array is connected to a bitline but each wordline alternatively connects micromirrors of adjacent rows. For example, bitlines $b_1$, $b_2$, $b_3$, $b_4$, and $b_5$ respectively connect micromirrors groups of ($a_{11}$, $a_{16}$, and $a_{21}$), ($a_{14}$ and $a_{19}$), ($a_{12}$, $a_{17}$, and $a_{22}$), ($a_{15}$ and $a_{20}$), and ($a_{13}$, $a_{18}$, and $a_{23}$). Wordlines $w_1$, $w_2$, and $w_3$ respectively connect micromirror groups ($a_{11}$, $a_{14}$, $a_{12}$, $a_{15}$, and $a_{13}$), ($a_{16}$, $a_{19}$, $a_{17}$, $a_{20}$, and $a_{18}$), and ($a_{21}$, $a_{22}$, and $a_{23}$). With this configuration, the total number of wordlines is less the total number of bitlines.

Figure 23:
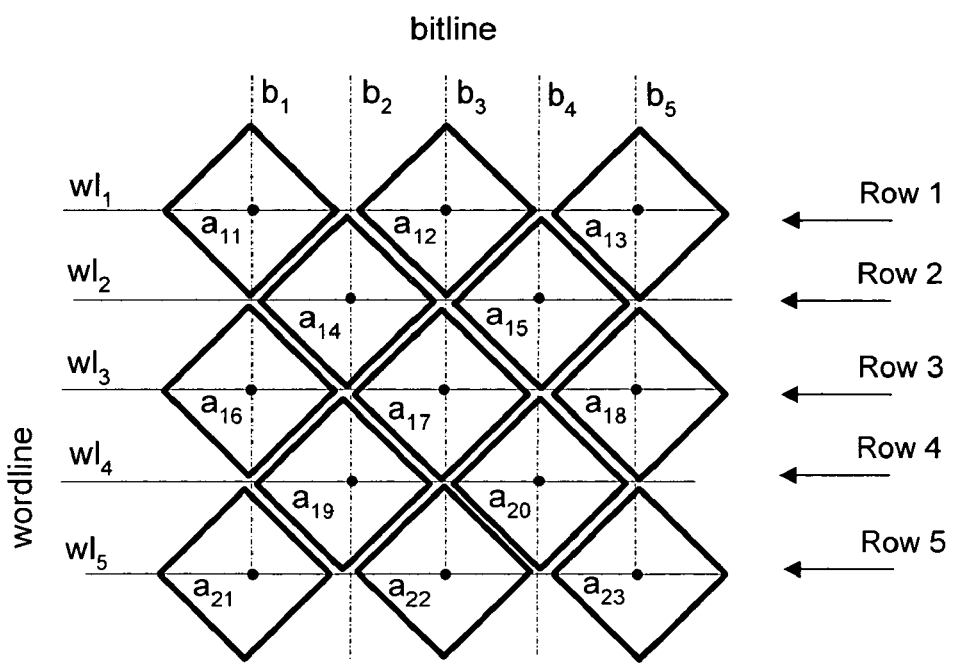
FIG. 23 illustrates a top view of another exemplary micromirror array device; and FIG. 24a to FIG. 24c illustrates yet another exemplary micromirror array device.

For the same micromirror array, the bitlines and wordlines can be deployed in other ways, such as that shown in FIG. 23. Referring to FIG. 15, each row of micromirrors is provided with one wordline and one bitline. Specifically, bitlines $b_1$, $b_2$, $b_3$, $b_4$ and $b_5$ respectively connect column 1 (comprising micromirrors $a_{11}$, $a_{16}$, and $a_{21}$), column 2 (comprising micromirrors $a_{14}$ and $a_{19}$), column 3 (comprising micromirrors $a_{12}$, $a_{17}$, and $a_{22}$), column 4 (comprising micromirrors $a_{15}$ and $a_{20}$), and column 5 (comprising micromirrors $a_{13}$, $a_{18}$, and $a_{23}$). Wordlines $WL_1$, $WL_2$, $WL_3$, $WL_4$, and $WL_5$ respectively connect row 1 (comprising micromirrors $a_{11}$, $a_{12}$, and $a_{13}$), row 2 (comprising micromirrors $a_{14}$ and $a_{15}$), row 3 (comprising micromirrors $a_{16}$, $a_{17}$, and $a_{18}$), row 4 (comprising micromirrors $a_{19}$ and $a_{20}$) and row 5 (comprising micromirrors $a_{21}$, $a_{22}$, and $a_{23}$).

Figure 24A:
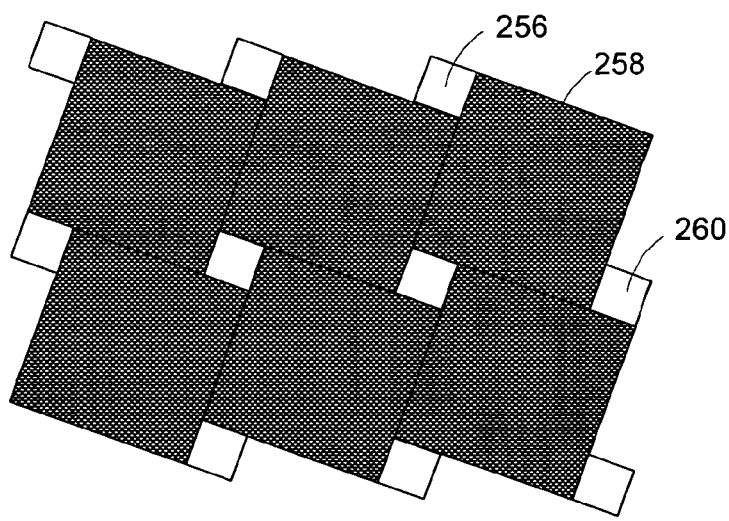
Figure 24B:
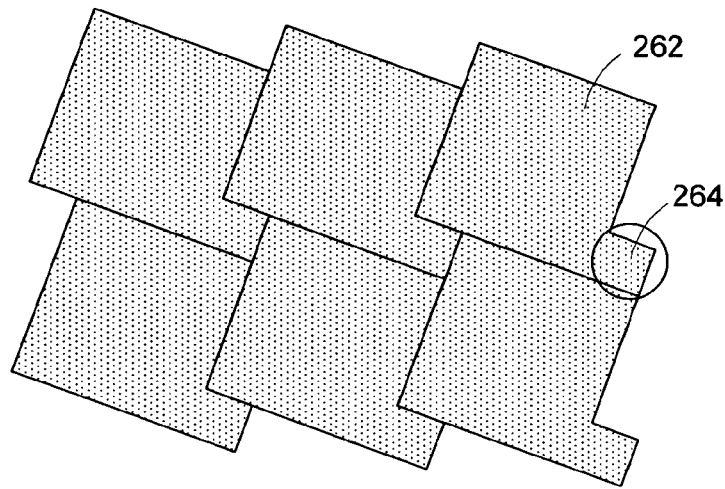
Figure 24C:
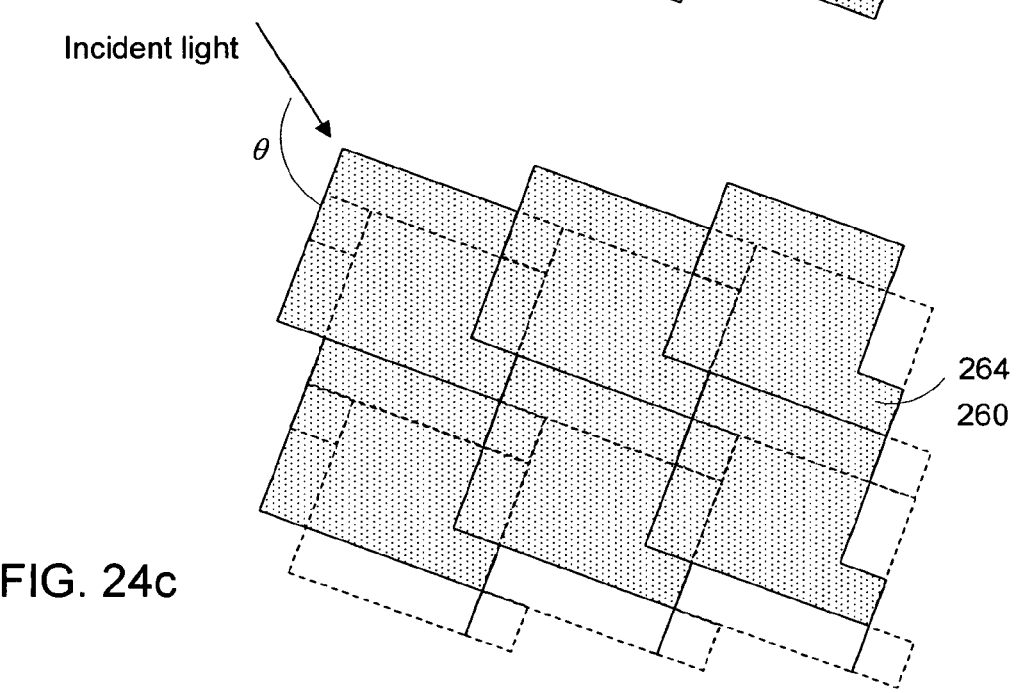

According to another embodiment of the invention, the mirror plates of the micromirrors in the array can form a plurality of pockets, in which posts can be formed, wherein the pockets are covered by the extended areas of the addressing electrodes when viewed from the top of the micromirror array device, as shown in FIGS. 24a to 24c.

Referring to FIG. 24a, a portion of an array of mirror plates of the micromirrors is illustrated therein. The mirror plates in the array form a plurality of pockets in between. For example, pockets 256 and 260 are formed in which posts for supporting and holding mirror plate 258 can be formed. For individually addressing and deflecting the mirror plates, an array of addressing electrodes is provided, a portion of which is illustrated in FIG. 24b.

Referring to FIG. 24b, each addressing electrode has an extended portion, such as extended portion 264 of addressing electrode 262. Without the extended portion, the addressing electrode can be generally square, but having an area equal to or smaller than the mirror plate.

FIG. 24c illustrates a top view of a micromirror array device after the addressing electrodes in FIG. 24b and the mirror plates in FIG. 24a that are assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

When used in a spatial light modulator of a display system, the incident light beam is directed onto the mirror plates in a direction along the displacement direction of the addressing electrodes when viewed from the top of the addressing electrodes as shown in the figure. For example, the incident light has an angle θ to an edge of the addressing electrode (or the mirror plate) when viewed from the top; and the angle can be 135° degrees.

In addition to characterizing the micromirrors with parameters of CID, twist angle $\theta_{twist}$, and side tilt angle $\theta_{side\ tilt}$ as discussed above, other parameters can also be selected and extracted from the captured interference fringe images of the mirror plates. For example, the response time of the individual mirror plates to the external electrostatic fields can be measured based on the captured interference fringe images, as set forth in U.S. patent application Ser. No. 10/875,760 filed Jun. 23, 2004, the subject matter being incorporated herein by reference. In another example, the intrinsic resonant frequencies of the individual deflectable mirror plates in the micromirror array can be measured based on the captured interference fringe images of the deflectable mirror plates, as set forth in U.S. patent application Ser. No. 10/875,555 filed Jun. 23, 2004, the subject matter being incorporated herein by reference.

The micromirrors in which embodiments of the invention can be implemented may be composed of any suitable materials and fabricated in many ways. According to the invention, the deflectable mirror plate comprises reflective film, preferably composed of a metallic material (e.g. aluminum, gold, silver) having a high reflectivity, deposited on another non-metallic material, such as $SiO_x$, $SiN_x$ and $TiN_x$ for enhancing the mechanical properties of the mirror plate. Alternatively, other materials, such as a barrier layer for preventing diffusion between the metallic reflecting layer and the mechanical enhancing layer, can be deposited between the metallic reflecting layer and the mechanical enhancing layer.

The deformable hinge preferably comprises an electrically conductive layer. Examples of suitable materials for the hinge layer are Al, Ir, titanium, titanium nitride, titanium oxide(s), titanium carbide, $TiSiN_x$, $TaSiN_x$, or other ternary and higher compounds.

It will be appreciated by those skilled in the art that a new and useful method and apparatus for characterizing micromirror array devices have been described herein. In view of many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof. In the claims, only elements denoted by the words "means for" are intended to be interpreted as means plus function claims under 35 U.S.C. §112, the sixth paragraph.

APPENDIX A

A BRIEF DESCRIPTION OF THE SOBEL DETECTOR

The Sobel operator performs a 2-D spatial gradient measurement on an image and so emphasizes regions of high spatial gradient that correspond to edges. Typically it is used to find the approximate absolute gradient magnitude at each point in an input grey-scale image. In theory at least, the operator consists of a pair of 3×3 convolution masks as shown in the following. A brief description of the convolution operator is attached in Appendix B. One mask is simply the other rotated by 90°.

| -1 | 0 | +1 |
|----|---|----|
| -2 | 0 | +2 |
| -1 | 0 | +1 |

Gx

| +1 | +2 | +1 |
|----|----|----|
| 0  | 0  | 0  |
| -1 | -2 | -1 |

Gy

These masks are designed to respond maximally to edges running vertically and horizontally relative to the pixel grid, one mask for each of the two perpendicular orientations. The masks can be applied separately to the input image, to produce separate measurements of the gradient component in each orientation (call these Gx and Gy). These can then be combined together to find the absolute magnitude of the gradient at each point and the orientation of that gradient. The gradient magnitude is given by:

$$|G|=\sqrt{Gx^2+Gy^2}$$

Although typically, an approximate magnitude is computed using:

$$|G|=|Gx|+|Gy|$$

which is much faster to compute.

The angle of orientation of the edge (relative to the pixel grid) giving rise to the spatial gradient is given by:

$$\theta=\arctan(Gy/Gz)-3\pi/4$$

In this case, orientation 0 is taken to mean that the direction of maximum contrast from black to white runs from left to right on the image, and other angles are measured anti-clockwise from this. Often, this absolute magnitude is the only output the user sees—the two components of the gradient are conveniently computed and added in a single pass over the input image using the pseudo-convolution operator shown in the following figure.

| $P_1$ | $P_2$ | $P_3$ |
|-------|-------|-------|
| $P_4$ | $P_5$ | $P_6$ |
| $P_7$ | $P_8$ | $P_9$ |

Pseudo-convolution masks used to quickly compute approximate gradient magnitude

Using this mask the approximate magnitude is given by:

$$|G|=|(P_1+2\times P_2+P_3)-(P_7+2\times P_s+P_s)|+|(P_3+2\times P_6-P_s)-(P_1+2\times P_4+P_7)|$$

APPENDIX B

A BRIEF DESCRIPTION OF CONVOLUTION

Convolution is a simple mathematical operation which is fundamental to many common image processing operators. Convolution provides a way of 'multiplying together' two arrays of numbers, generally of different sizes, but of the same dimensionality, to produce a third array of numbers of the same dimensionality. This can be used in image processing to implement operators whose output pixel values are simple linear combinations of certain input pixel values.

In an image processing context, one of the input arrays is normally just a gray level image. The second array is usually much smaller, and is also two dimensional (although it may be just a single pixel thick). The following shows an example image and kernel that we will use to illustrate convolution.

| $I_{11}$ | $I_{12}$ | $I_{13}$ | $I_{14}$ | $I_{15}$ | $I_{16}$ | $I_{17}$ | $I_{18}$ | $I_{19}$ |
|----------|----------|----------|----------|----------|----------|----------|----------|----------|
| $I_{21}$ | $I_{22}$ | $I_{23}$ | $I_{24}$ | $I_{25}$ | $I_{26}$ | $I_{27}$ | $I_{28}$ | $I_{29}$ |
| $I_{31}$ | $I_{32}$ | $I_{33}$ | $I_{34}$ | $I_{35}$ | $I_{36}$ | $I_{37}$ | $I_{38}$ | $I_{39}$ |
| $I_{41}$ | $I_{42}$ | $I_{43}$ | $I_{44}$ | $I_{45}$ | $I_{46}$ | $I_{47}$ | $I_{48}$ | $I_{49}$ |
| $I_{51}$ | $I_{52}$ | $I_{53}$ | $I_{54}$ | $I_{55}$ | $I_{56}$ | $I_{57}$ | $I_{58}$ | $I_{59}$ |
| $I_{61}$ | $I_{62}$ | $I_{63}$ | $I_{64}$ | $I_{65}$ | $I_{66}$ | $I_{67}$ | $I_{68}$ | $I_{69}$ |

| $K_{11}$ | $K_{12}$ | $K_{13}$ |
|----------|----------|----------|
| $K_{21}$ | $K_{22}$ | $K_{23}$ |

An example small image (left) and kernel (right) for illustrating convolution. The labels within each grid square are used to identify each square.

The convolution is performed by sliding the kernel over the image, generally starting at the top left corner, so as to move the kernel through all the positions where the kernel fits entirely within the boundaries of the image. (Note that implementations differ in what they do at the edges of images as explained below.) Each kernel position corresponds to a single output pixel, the value of which is calculated by multiplying together the kernel value and the underlying image pixel value for each of the cells in the kernel, and then adding all these numbers together.

So in this example, the value of the bottom right pixel in the output image will be given by:

$$O_{57}=I_{57}K_{11}+I_{58}K_{12}+I_{59}K_{13}+I_{67}K_{21}+I_{68}K_{22}+I_{69}K_{23}$$

If the image has M rows and N columns, and the kernel has m rows and n columns, then the size of the output image will have M−m+1 rows, and N−n+1 columns.

Mathematically we can write the convolution as:

$$O(i, j) = \sum_{k=1}^{m} \sum_{l=1}^{n} I(i+k-1, j+l-1) K(k, l)$$

wherein i runs from 1 to M−m+1 and j runs from 1 to N−n+1.

Note that many implementations of convolution produce a larger output image than this because they relax the constraint that the kernel can only be moved to positions where it fits entirely within the image. Instead, these implementations typically slide the kernel to all positions where just the top left corner of the kernel is within the image. Therefore the kernel 'overlaps' the image on the bottom and right edges. One advantage of this approach is that the output image is the same size as the input image. Unfortunately, in order to calculate the output pixel values for the bottom and right edges of the image, it is necessary to invent input pixel values for places where the kernel extends off the end of the image. Typically pixel values of zero are chosen for regions outside the true image, but this can often distort the output image at these places. Therefore in general if you are using a convolution implementation that does this, it is better to clip the image to remove these spurious regions. Removing n−1 pixels from the right hand side and m−1 pixels from the bottom will fix things

We claim:

1. A method, comprising:
   loading a sample into a measurement system, wherein the sample comprises a light transmissive substrate and a plurality of reflective microelements, and wherein the measurement system comprises a beam splitter, a reference mirror, and a first compensation lens located between the beam splitter and the reference mirror;
   capturing an interference fringe image of the plurality of reflective microelements using an illumination light that is split into a reference beam and a sample beam, wherein the sample beam passes through the light transmissive substrate and wherein the reference beam passes through the first compensation lens which compensates for aberrations from the reference mirror; and
   analyzing the captured interferometer fringe image so as to determine the geometric center of at least one of the microelements.

2. The method of claim 1, further comprising extracting a set of parameters that characterize the reflective surfaces of the plurality of reflective microelements.

3. The method of claim 1, wherein the microelements are reflective deflectable mirror plates of an array of micromirrors.

4. The method of claim 1, wherein the plurality of reflective microelements are disposed between the light transmissive substrate and a semiconductor substrate having an array of addressing electrodes.

5. The method of claim 4, wherein the plurality of reflective microelements are formed on the semiconductor substrate.

6. The method of claim 4, wherein the plurality of reflective microelements are formed on the light transmissive substrate.

7. The method of claim 1, wherein the plurality of reflective microelements are enclosed within a space between a package substrate and a light transmissive package cover bonded to the package substrate.

8. The method of claim 1, wherein the sample is a wafer comprising a plurality of dies, each die having an array of mirror plates.

9. The method of claim 1, wherein the step of capturing the interference fringe image further comprises:
   obtaining an image of the microelements;
   determining whether the interference fringe generated by the sample beam and the reference beam is present in the obtained image; and
   if the interference fringe is not present in the obtained image, adjusting a position of the sample so as to obtain the interference fringe.

10. The method of claim 9, farther comprising adjusting a second compensation lens disposed between the beam splitter and the sample.

11. The method of claim 9, wherein the step of adjusting the position of the sample further comprises actuating a micro-actuator in a sample holder having a supporting surface on which the sample is attached.

12. The method of claim 2, wherein at least one of the set of parameters comprises a curvature of the microelements.

13. The method of claim 2, wherein at least one of the set of parameters comprises a side tilt of the microelements.

14. The method of claim 2, wherein at least one of the set of parameters comprises a twist of the microelements.

15. The method of claim 1, farther comprising, characterizing a quality of the sample based on at least the captured interference fringe image.

16. The method of claim 1, wherein the geometric center is determined at least in part through the use of a reference grid.

17. A method, comprising:
   loading a sample into a measurement system, wherein the sample comprises a plurality of reflective microelements, and wherein the plurality of reflective microelements are covered with a light transmissive substrate;
   capturing an interference fringe image of the plurality of reflective microelements using an illumination light that passes through the light transmissive substrate, an objective lens, a beam splitter, a reflective mirror, and a light transmissive plate disposed between said beam splitter and said reflective mirror, the light transmissive plate compensating for distortions caused by the reference mirror;
   analyzing the captured interferometer fringe image so as to determine the geometric center of at least one of the microelements; and
   characterizing a quality of the sample based on at least the captured interference fringe image.

18. The method of claim 17, wherein the captured interference fringe image has at least a resolution of 1 micron.

19. The method of claim 17, wherein the objective lens has a magnification of 10 times or higher.

20. The method of claim 17, wherein the objective lens has a magnification of 20 times or higher.

21. The method of claim 17, wherein the objective lens has a magnification of 30 times or higher.

22. The method of claim 17, wherein the objective lens has a magnification of 45 times or higher.

23. The method of claim 17, wherein the objective lens has a magnification of 60 times or higher.

* * * * *